(12) United States Patent
Jung

(10) Patent No.: US 10,769,988 B2
(45) Date of Patent: Sep. 8, 2020

(54) DISPLAY DEVICE CONFIGURED TO MEASURE LIGHT AND ADJUST DISPLAY BRIGHTNESS AND A METHOD OF DRIVING THE SAME

(71) Applicant: SAMSUNG DISPLAY CO., LTD., Yongin-si, Gyeonggi-do (KR)

(72) Inventor: Keumdong Jung, Seoul (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 50 days.

(21) Appl. No.: 15/971,811

(22) Filed: May 4, 2018

(65) Prior Publication Data

US 2019/0035328 A1    Jan. 31, 2019

(30) Foreign Application Priority Data

Jul. 25, 2017    (KR) .......................... 10-2017-0094374

(51) Int. Cl.

| G09G 3/3225 | (2016.01) |
|---|---|
| G03B 21/00 | (2006.01) |
| G03B 21/10 | (2006.01) |
| G03B 21/56 | (2006.01) |
| G03B 21/60 | (2014.01) |
| G03B 21/20 | (2006.01) |

(52) U.S. Cl.
CPC ......... *G09G 3/3225* (2013.01); *G03B 21/006* (2013.01); *G03B 21/10* (2013.01); *G03B 21/204* (2013.01); *G03B 21/56* (2013.01); *G03B 21/60* (2013.01); *G09G 2320/062* (2013.01); *G09G 2320/0666* (2013.01); *G09G 2360/142* (2013.01); *G09G 2360/148* (2013.01)

(58) Field of Classification Search
None
See application file for complete search history.

(56) References Cited

U.S. PATENT DOCUMENTS

| 5,386,543 | A | 1/1995 | Bird |
| 5,990,853 | A | 11/1999 | Kuratomi et al. |
| 6,654,156 | B1 | 11/2003 | Crossland et al. |
| 6,986,581 | B2 * | 1/2006 | Sun ........................ G03B 21/60 |
| | | | 353/31 |
| 7,537,346 | B2 | 5/2009 | Liu et al. |
| 7,915,649 | B2 | 3/2011 | Im et al. |
| 8,152,306 | B2 | 4/2012 | Liu et al. |
| 8,371,697 | B2 | 2/2013 | Kemp et al. |

(Continued)

FOREIGN PATENT DOCUMENTS

| KR | 1020010099935 | 11/2001 |
| KR | 10-1672343 | 10/2016 |

*Primary Examiner* — Kenneth B Lee, Jr.
(74) *Attorney, Agent, or Firm* — F. Chau & Associates, LLC

(57) ABSTRACT

A display device includes a screen having a plurality of pixels displaying an image. A projector includes a light source emitting a first light and a light converter configured to change an intensity of the first light with respect to each of the plurality of pixels so that the projector emits a conversion light. Each of the plurality of pixels of the screen includes a light receiving element configured to receive the conversion light and to generate a current proportional to an intensity of the conversion light. A light emitting element is configured to display the image based on the generated current.

22 Claims, 23 Drawing Sheets

(56) References Cited

U.S. PATENT DOCUMENTS

| | | |
|---|---|---|
| 8,497,535 B2 | 7/2013 | Lee et al. |
| 8,508,507 B2 | 8/2013 | Lee et al. |
| 8,890,771 B2 | 11/2014 | Pance |
| 8,917,260 B2 | 12/2014 | Kim et al. |
| 9,287,436 B2 | 3/2016 | Han et al. |
| 9,354,604 B2 | 5/2016 | Lee et al. |
| 9,442,338 B2 | 9/2016 | Uhm et al. |
| 9,753,361 B2 | 9/2017 | Montgomery |
| 2007/0069632 A1 | 3/2007 | Peng |
| 2013/0010013 A1 | 1/2013 | Li et al. |
| 2014/0300830 A1 | 10/2014 | Wang |
| 2014/0307307 A1 | 10/2014 | Georgiou et al. |
| 2014/0375763 A1 | 12/2014 | Lee et al. |
| 2015/0310251 A1 | 10/2015 | Wyrwas et al. |
| 2015/0331508 A1 | 11/2015 | Nho et al. |
| 2016/0048016 A1 | 2/2016 | Crane et al. |
| 2017/0082736 A1 | 3/2017 | Hofmann et al. |
| 2017/0208303 A1* | 7/2017 | Toyooka ............... G02B 5/3083 |

* cited by examiner

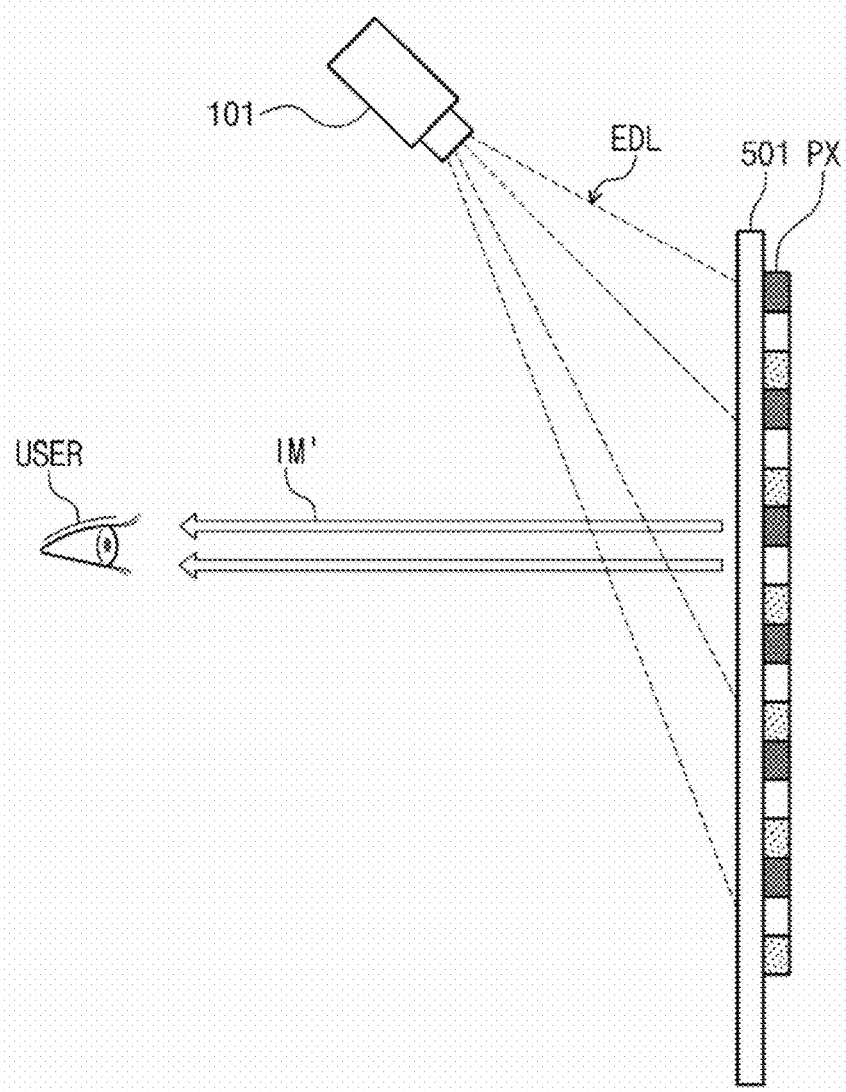

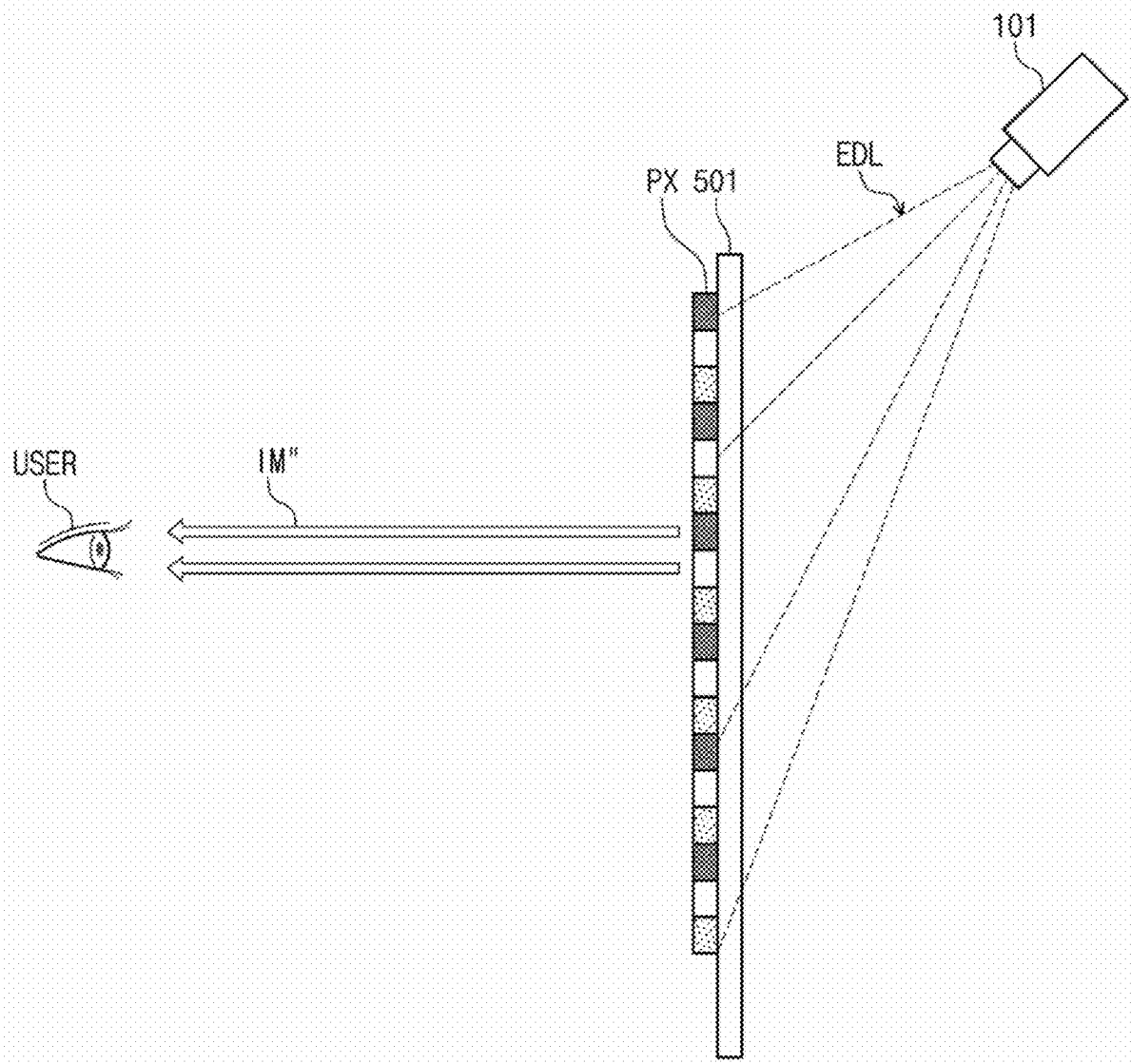

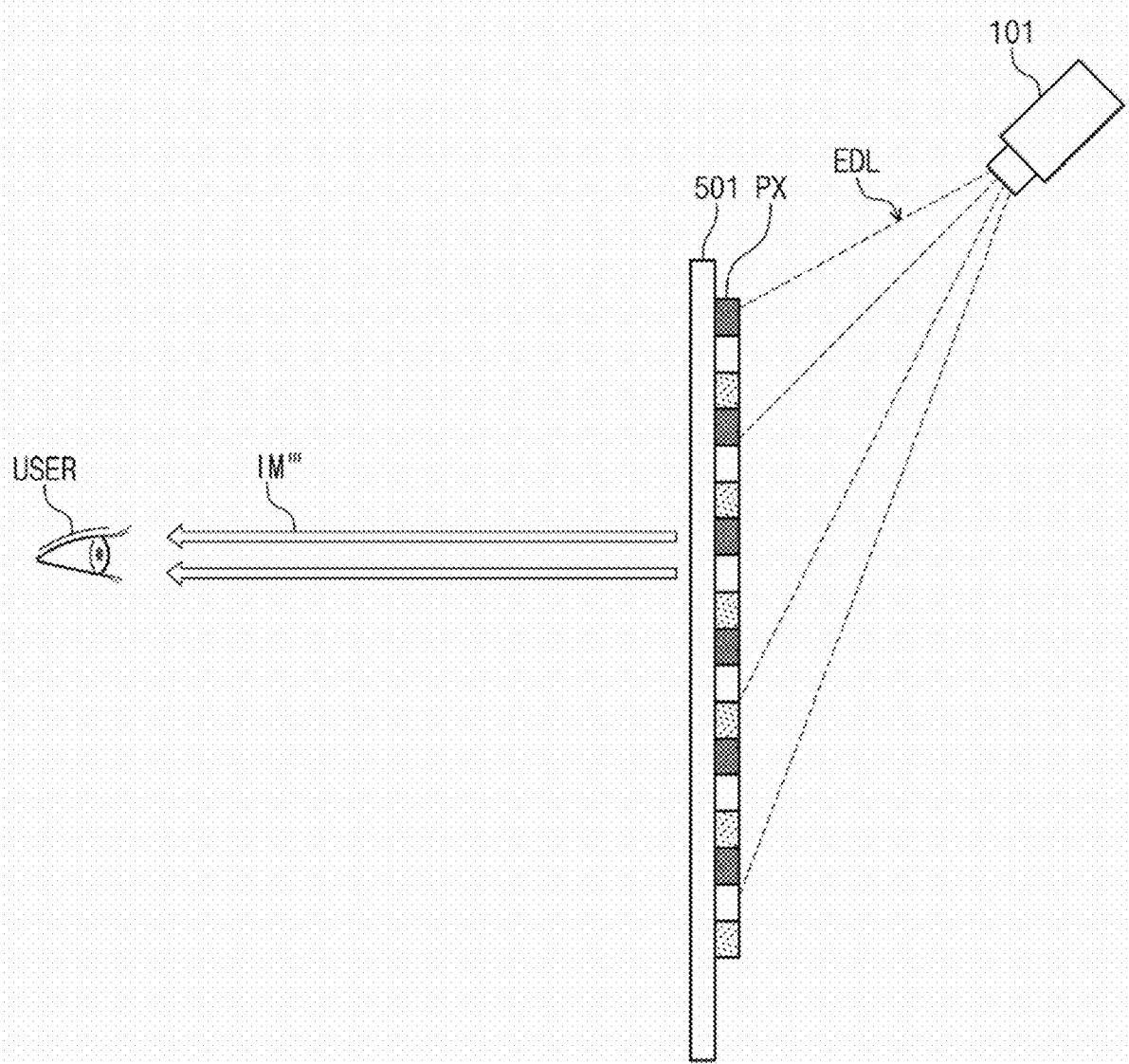

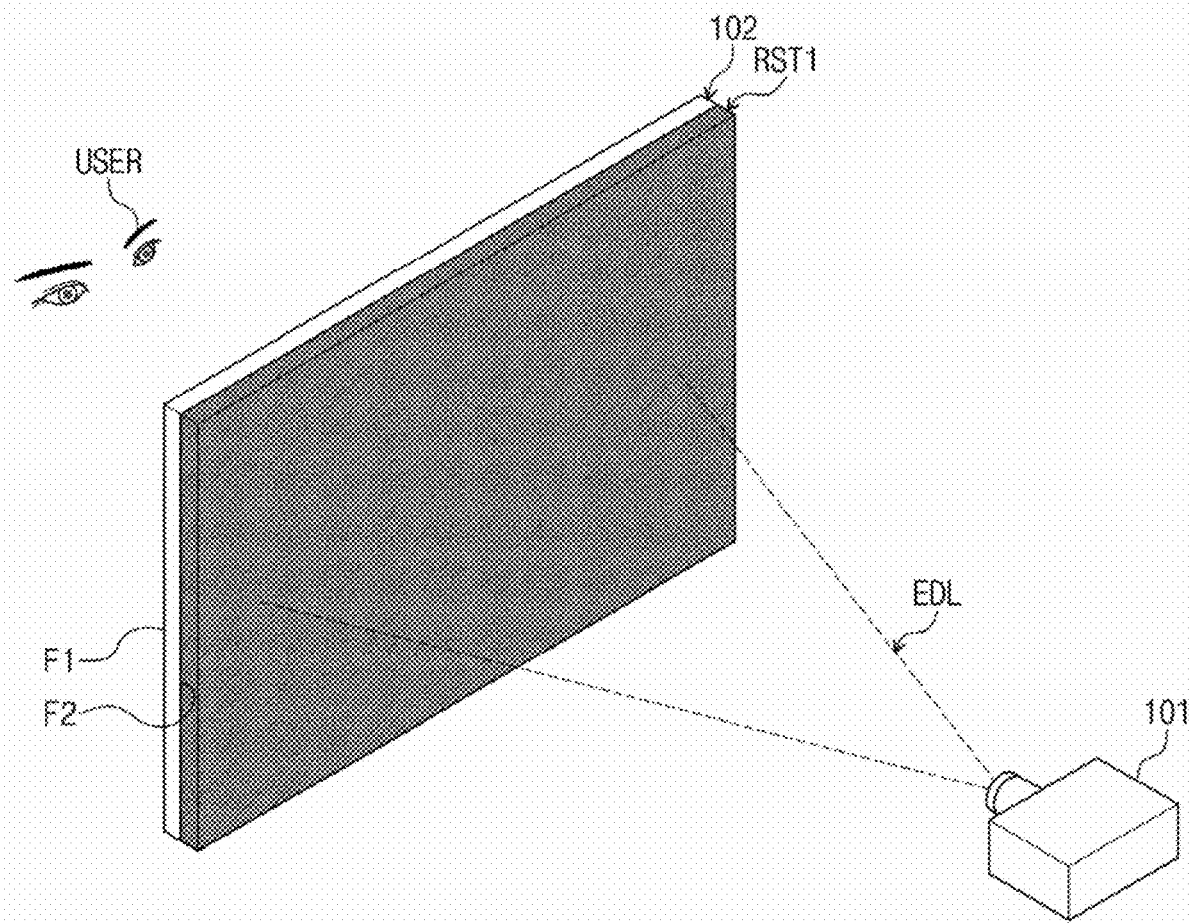

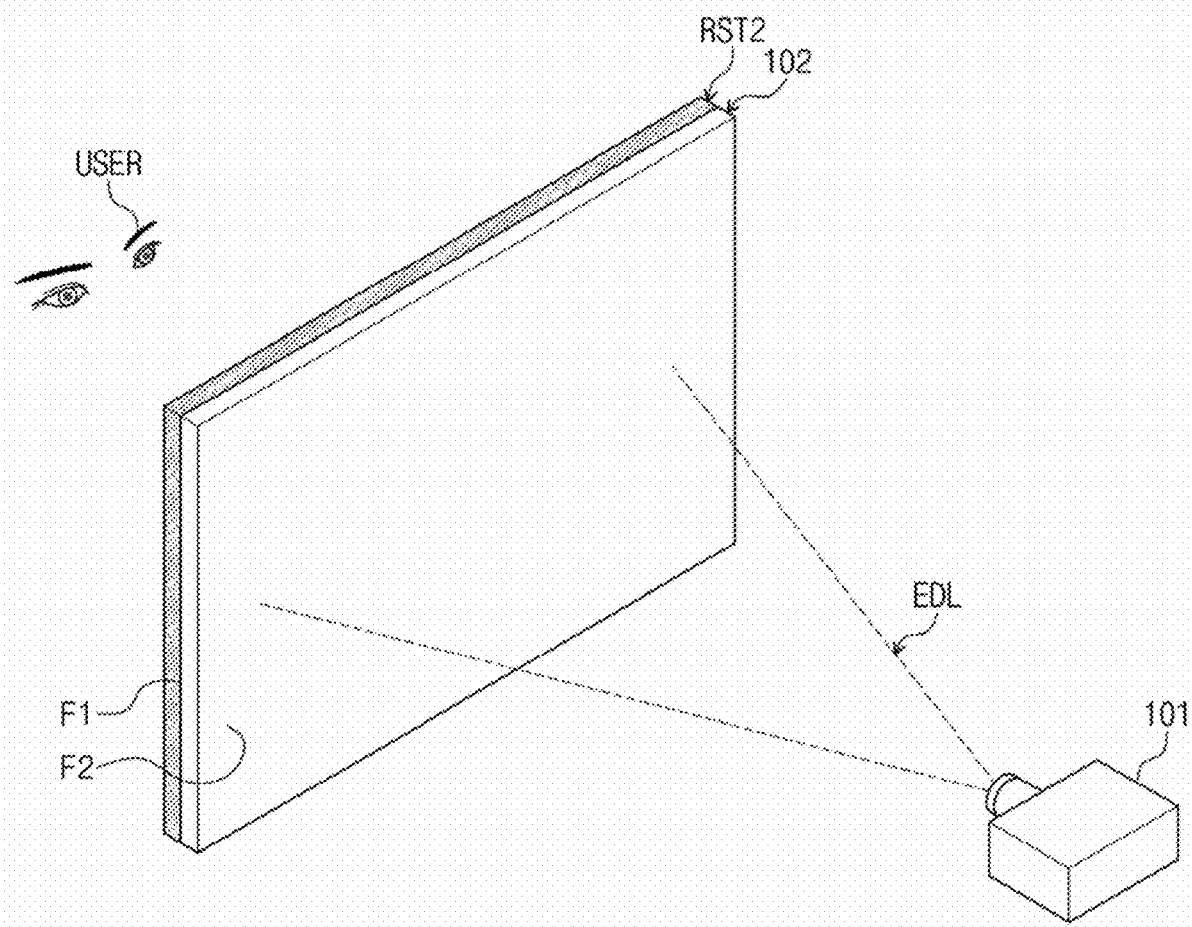

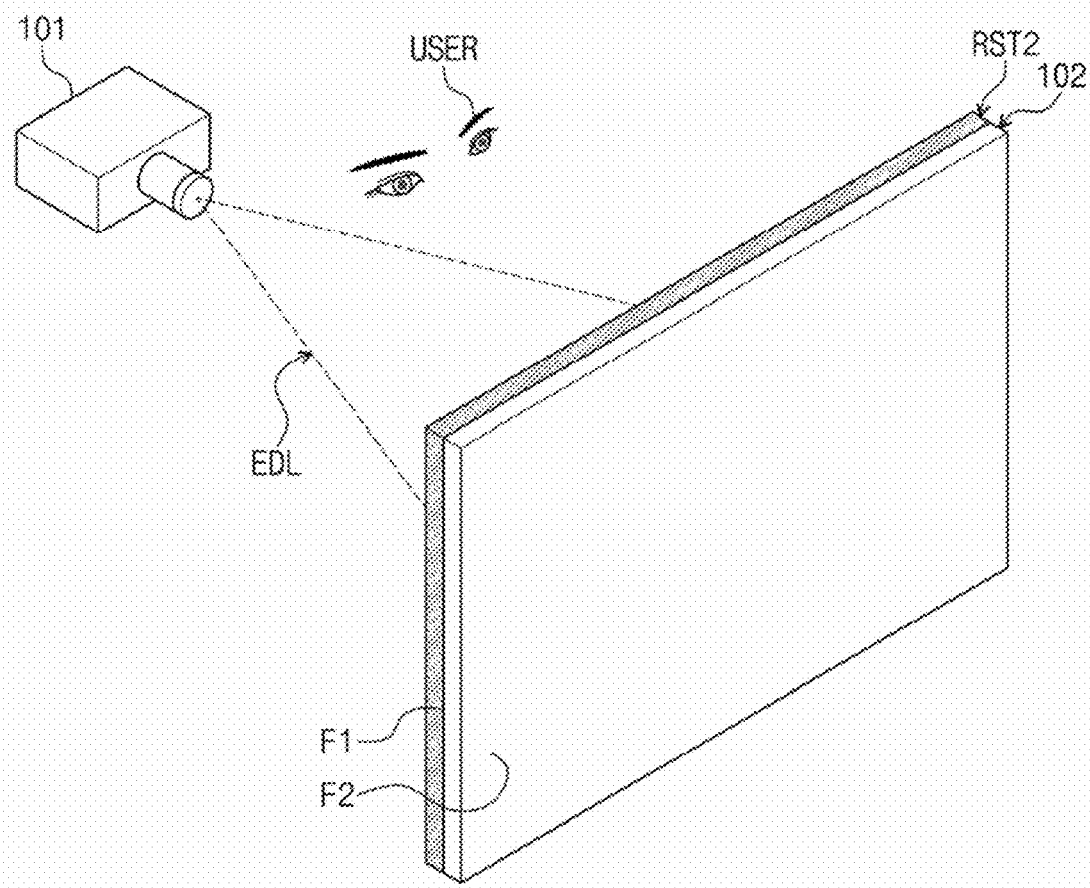

ism DISPLAY DEVICE CONFIGURED TO
MEASURE LIGHT AND ADJUST DISPLAY
BRIGHTNESS AND A METHOD OF DRIVING
THE SAME

CROSS-REFERENCE TO RELATED
APPLICATION

This U.S. non-provisional patent application claims priority under 35 U.S.C. § 119 to Korean Patent Application No. 10-2017-0094374, filed on Jul. 25, 2017, the contents of which are hereby incorporated by reference in its entirety.

TECHNICAL FIELD

The present disclosure relates to a display device and, more particularly, to a display device configured to measure light and adjust display brightness and a method of driving the display device.

DISCUSSION OF THE RELATED ART

Various types of display systems are used in association with electronic devices. For example, display systems are used in television sets, computer monitors, electric signboards, electronic photo frames, kiosks, mobile phones, beam projectors, etc.

The display systems used in these and other electronic devices may be of various different sizes. For example, large-scale outdoor display systems have been widely used. These large-scale display systems tend to be either fixed display systems installed in the outdoor venues or mobile display systems that are transported to various locations after being installed in a movable structure such as a vehicle.

Usually, the display systems used in outdoor locations tend to be operated during the daytime. In this case, when light from the sun or light reflected by surrounding reflectors are incident upon a display screen of the display systems, visibility of the display systems is deteriorated. Even when the display systems are used in indoor locations, the visibility of the display systems may still be deteriorated due to sunlight that comes through a window, or as a result of indoor light generated from indoor lighting fixtures, or handheld light sources.

SUMMARY

A display device includes a screen having a plurality of pixels displaying an image. A projector includes a light source emitting a first light and a light converter configured to change an intensity of the first light with respect to each of the plurality of pixels so that the projector emits a conversion light. Each of the plurality of pixels of the screen includes a light receiving element configured to receive the conversion light and to generate a current proportional to an intensity of the conversion light. A light emitting element is configured to display the image based on the generated current.

A display device includes a light receiving element configured to receive an external light and to generate a current proportional to an intensity of the external light. A light emitting element is configured to display an image based on the generated current. The external light includes brightness information of the image.

A method of driving a display device includes emitting a first light. An intensity of the first light with respect to each of a plurality of pixels is changed to emit a conversion light comprising brightness information of an image. The conversion light is emitted to each of the plurality of pixels. The conversion light is received to generate a current proportional to the intensity of the conversion light. The image is displayed based on the generated current.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIGS. 14A to 14C are diagrams illustrating a method in which a user USER views an image displayed through a display device according to an exemplary embodiment of the present disclosure; and FIGS. 15A to 15C are diagrams illustrating a display device according to an exemplary embodiment of the present disclosure.

DETAILED DESCRIPTION

Figure 1:
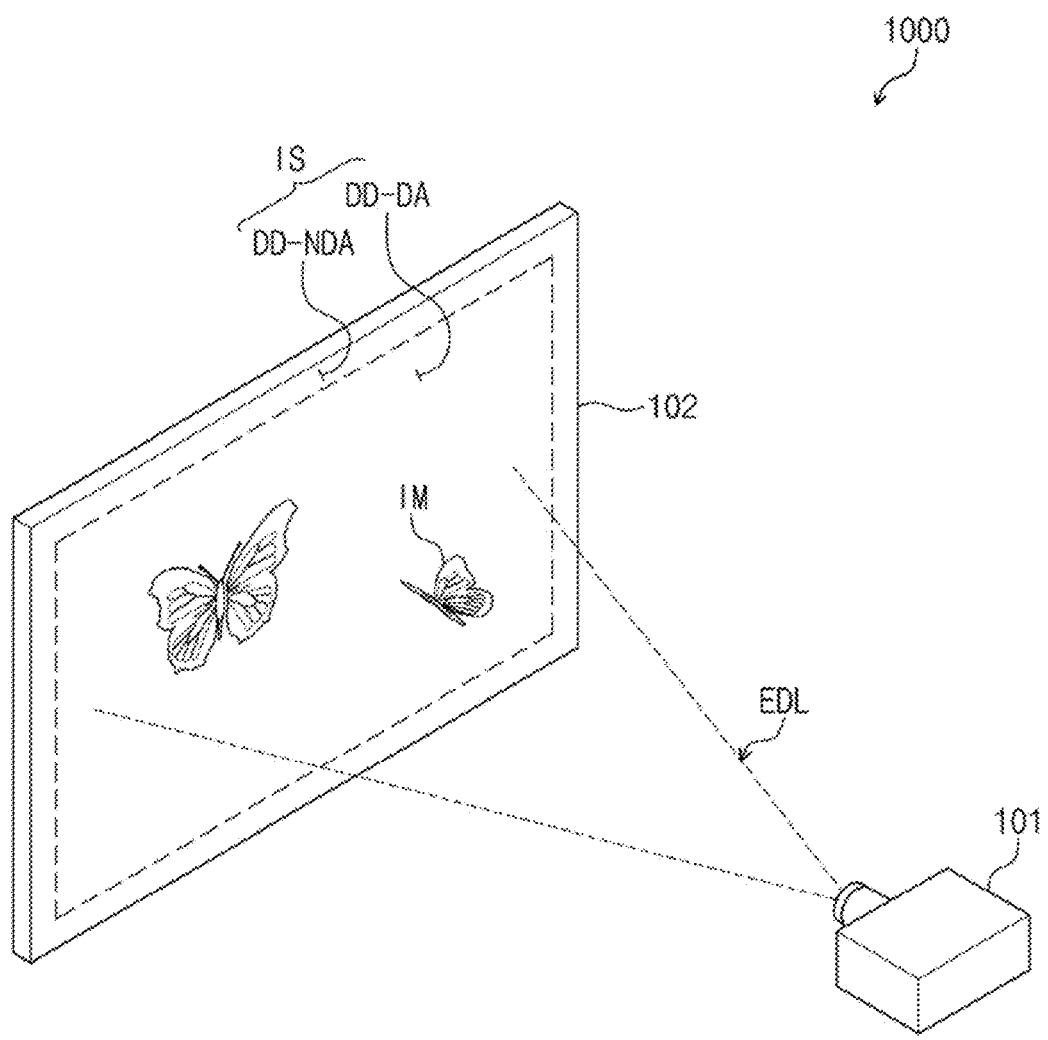
FIG. 1 is a perspective view illustrating a display device according to an exemplary embodiment of the present disclosure.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

In the following descriptions, it will be understood that when an element or layer is referred to as being "on", "connected to" or "coupled to" another element or layer, it can be directly on, connected or coupled to the other element or layer or intervening elements or layers may be present.

Like numerals may refer to like elements throughout the specification and the drawings. In the drawings, the thickness, shape, and size of elements may be exaggerated for clarity.

The use of the terms first, second, etc. might not denote order or importance, but rather the terms first, second, etc. may be used to distinguish one element from another. Thus, a first element, component, region, layer or section discussed below could be termed a second element, component, region, layer or section without departing from the teachings of the present disclosure.

Figure 2A:
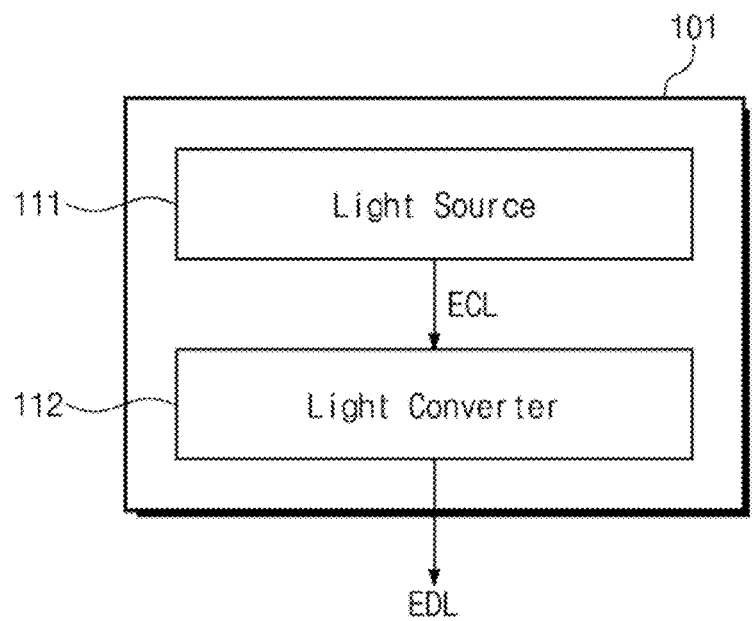
FIG. 2A is a block diagram illustrating a projector according to an exemplary embodiment of the present disclosure.
Figure 2B:
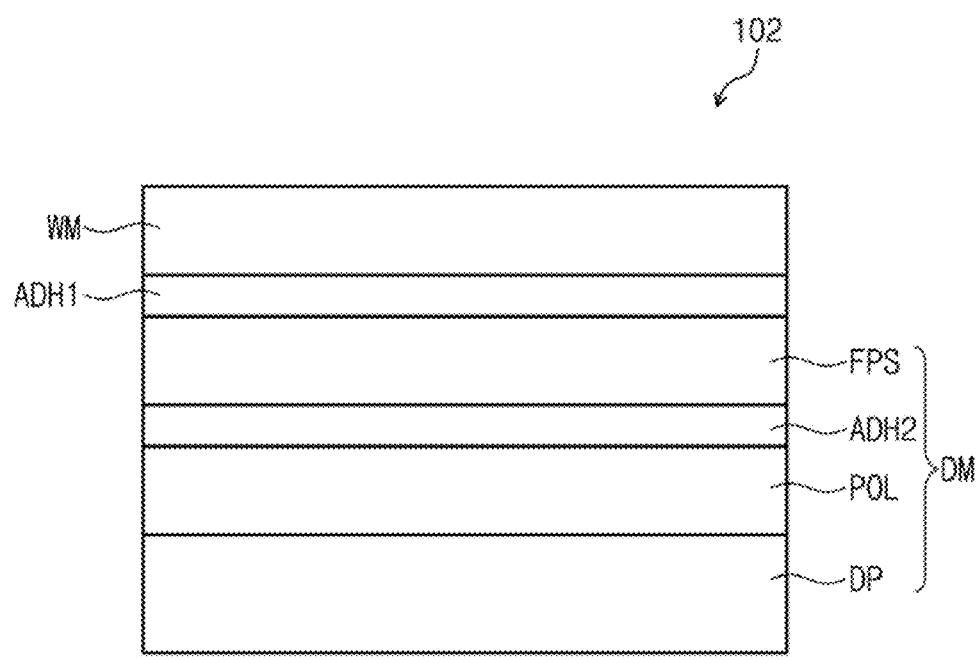
FIG. 2B is a cross-sectional view illustrating a portion of a screen shown in FIG. 1.

FIG. 1 is a perspective view illustrating a display device 1000 according to an exemplary embodiment of the present disclosure. FIG. 2A is a block diagram illustrating a projector 101 or backlight unit according to an exemplary embodiment of the present disclosure. FIG. 2B is a cross-sectional view illustrating a portion of a screen 102 shown in FIG. 1.

Referring to FIG. 1, the display device 1000 includes the projector 101 or backlight unit and the screen 102.

The screen 102 may be applied to a large-sized electronic device, such as a television set, a monitor, etc. Alternatively, the screen 102 may be applied to a small or medium-sized electronic device, such as a smartphone, a tablet computer, a car navigation unit, a handheld game console, a smart watch, etc. In the following descriptions, a large-sized monitor will be described as the screen 102 as an example.

The screen 102 displays an image IM based on light EDL emitted by the projector 101 or backlight unit This will be described in detail later. The screen 102 may display the image IM on a display surface IS thereof using the light EDL.

The display surface IS, on which the image IM is displayed, includes a display area DD-DA, within which the image IM is displayed, and a non-display area DD-ND A disposed adjacent to the display area DD-DA. The image IM is not displayed in the non-display area DD-NDA. For example, the display area DD-DA has a quadrangular shape, and the non-display area DD-NDA surrounds the display area DD-DA, however, the display area DD-DA and the non-display area DD-NDA may have various other shapes and arrangements. For example, the shape of the display area DD-DA may be arbitrary and the shape of the non-display area DD-NDA may be suitable to be disposed around or otherwise alongside the arbitrary shape of the display area DD-DA.

In FIG. 1, the screen 102 has a thin quadrangular plate shape, however, the screen 102 may have other shapes. For example, the screen 102 may have a curved shape that is inwardly or outwardly curved.

The projector 101 or backlight unit may project the light EDL onto the screen 102. The screen 102 may receive the light EDL provided from the projector 101 or backlight unit.

Referring to FIG. 2A, the projector 101 or backlight unit may include a light source 111 and a light converter 112.

The light source 111 may output a light ECL to the light converter 112. The light converter 112 may receive the light ECL from the light source 111 and generate a conversion light EDL obtained by converting an intensity of the light ECL to correspond to each of a plurality of pixels PX (refer to FIG. 3). For example, the light converter 112 may generate the conversion light EDL using a liquid crystal layer (not shown). For example, the light converter 112 may change an alignment of liquid crystals of the liquid crystal layer and allows the light ECL from the light source 111 to pass through the liquid crystal layer in which the alignment of the liquid crystals is changed to convert the intensity of the light ECL corresponding to the image IM (refer to FIG. 1) displayed by the pixels, thereby generating the conversion light EDL. However, according to an embodiment, the light converter 112 may convert the light ECL from the light source 111 in various ways to generate the conversion light EDL. The light converter 112 will be described in detail later.

The conversion light EDL may include information pertaining to the image IM (refer to FIG. 1) displayed by the pixels PX. For example, the information pertaining to the image may include grayscale information and brightness information, which correspond to each pixel PX, but other information may be included. For example, the information on the image may include any information that affects the display of the image.

The light source 111 may emit the conversion light EDL (refer to FIG. 1) and project the conversion light EDL to the screen 102. The light EDL projected to the screen 102 may be received by the pixels PX of the screen 102 and may pass therethrough.

Referring to FIG. 2B, the screen 102 includes a window WM and a display module DM. The window WM and the display module DM are attached to each other by a first adhesive member ADH1.

The display module DM includes an input sensing circuit FPS, a display panel DP, and an anti-reflection member POL. The input sensing circuit FPS and the display panel DP are attached to each other by a second adhesive member ADH2.

Each of the first and second adhesive members ADH1 and ADH2 may be an optically clear adhesive (OCA) film, an optically clear resin (OCR), and/or a pressure sensitive adhesive (PSA) film. According to an exemplary embodiment of the present disclosure, each of the first and second adhesive members ADH1 and ADH2 includes a light-curable adhesive material or a heat-curable adhesive material, but the alternative arrangements may be used.

The window WM is configured to protect the display module DM from external damage and may provide a touch sensing surface or a fingerprint recognition surface to the user. The display surface IS shown in FIG. 1 may be a touch sensing surface used to sense whether a user's touch occurs.

The window WM includes a glass material or another transparent material offering suitable protection.

The display panel DP may include a plurality of light emitting elements. The display panel DP may generate the image IM (refer to FIG. 1) corresponding to image data input thereto. A process of manufacturing the display panel DP may include a low temperature polycrystalline silicon (LTPS) process or a low temperature polycrystalline oxide (LTPO) process.

The input sensing circuit FPS may be disposed above the display panel DP. The input sensing circuit FPS may obtain coordinate information with respect to an external touch event. According to an exemplary embodiment of the present disclosure, the input sensing circuit FPS may be attached to the display panel DP after being manufactured by a separate process. However, according to an exemplary embodiment of the present disclosure, the input sensing circuit FPS may be disposed directly on one surface of the display panel DP. For example, the input sensing circuit FPS and the display panel DP may be manufactured through consecutive processes. In this case, the input sensing circuit FPS may be coupled to the display panel DP without using the second adhesive member ADH2.

The input sensing circuit FPS may include a plurality of sensors configured to sense whether an external object makes contact with the input sensing circuit FPS. The external object may be stylus or a finger of the user, and in the latter case, the finger of the user and the input sensing circuit FPS may form a capacitance.

The anti-reflection member POL may be disposed between the display panel DP and the input sensing circuit FPS. The anti-reflection member POL may absorb, destructively interfere, or polarize the external light incident thereto to reduce a reflectance of the external light.

According to an exemplary embodiment of the present disclosure, the anti-reflection member POL may include a color filter, a stacked structure including a conductive layer/a dielectric layer/a conductive layer, a polarizer, and/or an optical member.

Figure 3:
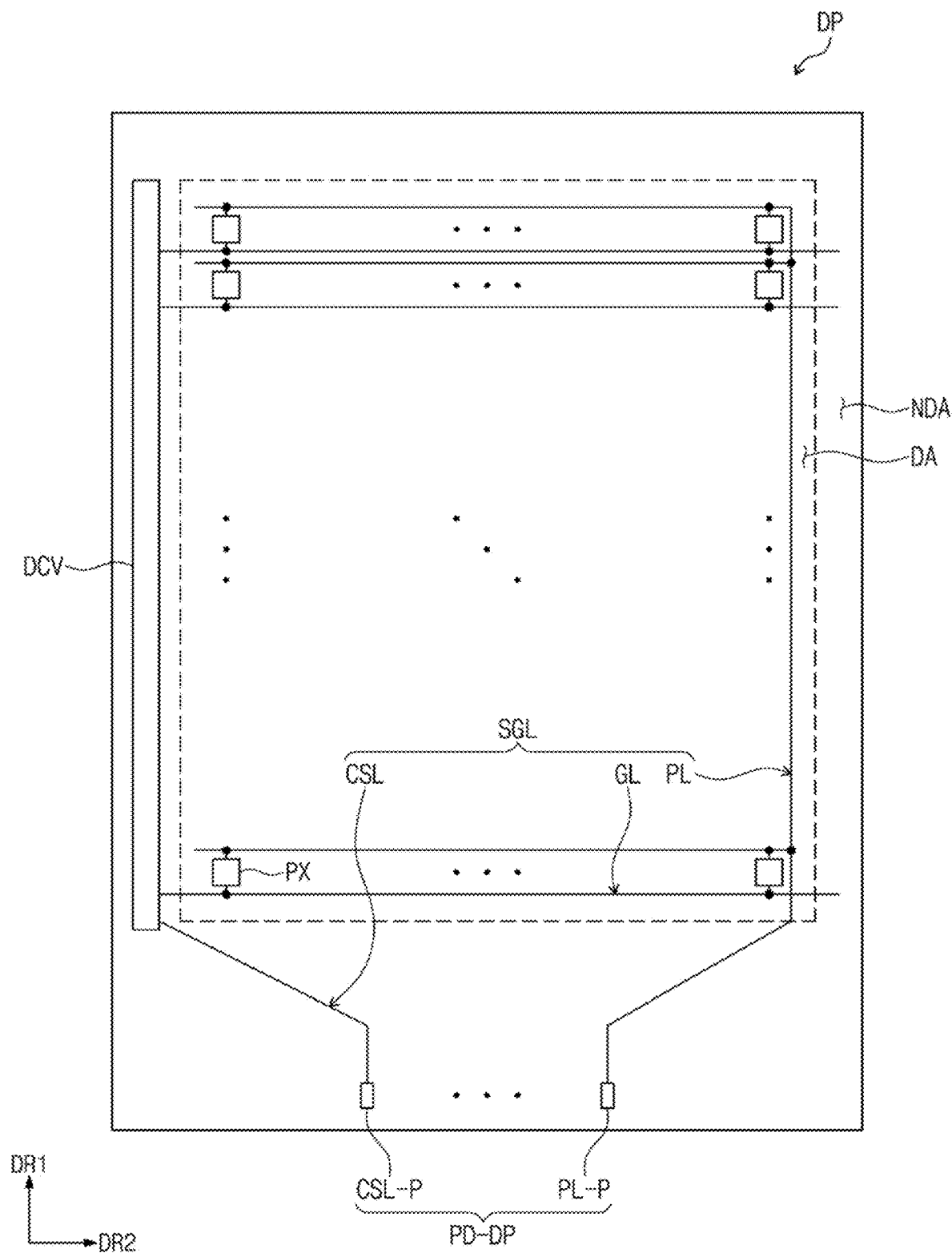
FIG. 3 is a plan view illustrating a display panel according to an exemplary embodiment of the present disclosure.

FIG. 3 is a plan view illustrating the display panel DP according to an exemplary embodiment of the present disclosure.

Referring to FIGS. 1 and 3, the display panel DP includes a display area DA and a non-display area NDA that occupy a common plane, when viewed in a plan view. The display area DA and the non-display area NDA of the display panel DP respectively correspond to the display area DD-DA and the non-display area DD-NDA of the screen 102. The display area DA and the non-display area NDA of the display panel DP need not be the same as the display area DD-DA and the non-display area DD-NDA of the screen 102, and the display area DA and the non-display area NDA of the display panel DP may be changed depending on the structure and design of the display panel DP.

The display panel DP includes a plurality of signal lines SGL and a plurality of pixels PX. An area in which the pixels PX are arranged is defined as the display are a DA. According to an exemplary embodiment of the present disclosure, the non-display area NDA may be defined along an edge of the display area DA.

The signal lines SGL may include gate lines GL, a power line PL, and a control signal line CSL. Each of the gate lines GL is connected to a corresponding pixel PX among the pixels PX. The power line PL is connected to the pixels PX. A gate driving circuit DCV, to which the gate lines GL are connected, is disposed at one side portion of the non-display area NDA. The control signal line CSL applies control signals to the gate driving circuit DCV.

Some of the gate lines GL, the power line PL, and the control signal line CSL are disposed on the same layer, and the others of the gate lines GL, the power line PL, and the control signal line CSL are disposed on different layers from each other. The aforementioned gate lines GL, power line PL, and the control signal line CSL that are disposed on one layer, are defined as first signal lines. Signal lines disposed on another layer are defined as second signal lines. Signal lines disposed on still another layer are defined as third signal lines.

A signal line part may include the gate lines GL, the power line PL, and the control signal line CSL. Display panel pads PD-DP may be connected to an end of the signal line part. The signal line part may correspond to portions of the gate lines GL, the power line PL, and the control signal line CSL except for the display panel pads PD-DP connected thereto.

The display panel pads PD-DP may be formed through a same process used to form the transistors that drive the pixels PX. For example, the display panel pads PD-DP may be formed through the low temperature polycrystalline silicon (LTPS) process or the low temperature polycrystalline oxide (LTPO) process, which is applied to form the transistors that drive the pixels PX.

According to an exemplary embodiment of the present disclosure, the display panel pads PD-DP may include a control pad CSL-P and a power pad PL-P. A gate pad part may be overlapped with and connected to the gate driving circuit DCV. An area of the non-display area NDA, in which the control pad CSL-P and the power pad PL-P are aligned, may be defined as a pad area.

The display panel DP, according to an exemplary embodiment of the present disclosure, might not include a data driver or data lines. This structure will be described in detail later.

Figure 4:
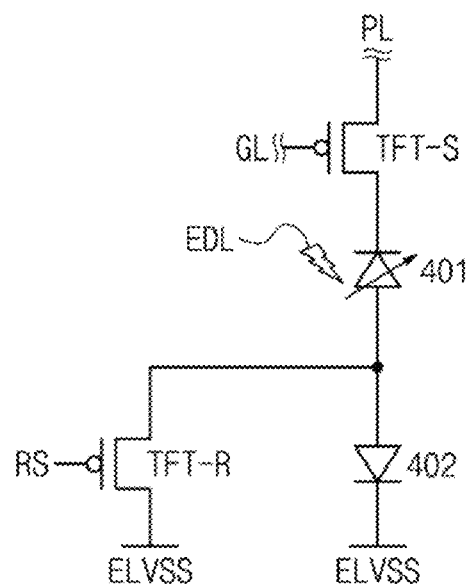
FIG. 4 is an equivalent circuit diagram illustrating a pixel shown in FIG. 3.

FIG. 4 is an equivalent circuit diagram illustrating the pixel PX shown in FIG. 3.

FIG. 4 shows the pixel connected to one gate line and the power line as a representative example. Other configurations of the pixel PX may be used.

The pixel PX may include a light emitting element 402 as a display element. The light emitting element 402 may be a front surface light emitting type diode, a rear surface light emitting type diode, or a dual-surface light emitting type diode. The light emitting element 402 may be an organic light emitting diode. According to an exemplary embodiment of the present disclosure, the light emitting elements 402 may be an LED device, an LD device, a QLED device, and/or a combination thereof. The pixel PX may further include a light receiving element 401 configured to drive the light emitting element 402. The light receiving element 401 may receive the conversion light EDL described with reference to FIG. 2A. For example, the light receiving element 401 may be a photodiode. The light receiving element 401 may receive the conversion light EDL and generate a current proportional to an intensity of the conversion light EDL.

The light emitting element 402 may be driven by the current provided from the light receiving element 401.

The pixel PX may further include a switch transistor TFT-S and a reset transistor TFT-R.

The switch transistor TFT-S may include a first electrode connected to the power line PL, a gate electrode connected to the gate line GL, and a second electrode connected to a cathode electrode of the light receiving element 401. According to an exemplary embodiment of the present disclosure, the first electrode of the switch transistor TFT-S may be a drain electrode, and the second electrode of the switch transistor TFT-S may be a source electrode. In addition, the switch transistor TFT-S shown in FIG. 4 may be a PMOS transistor, but an NMOS transistor may alternatively be used as the switch transistor TFT-S according to some exemplary embodiments of the present disclosure.

The light receiving element 401 may be controlled by the switch transistor TFT-S. The display device, according to an exemplary embodiment of the present disclosure, may further include a power drive unit. The power drive unit may provide a power source to the pixels PX (refer to FIG. 3). For example, when a signal is applied to the gate line GL and the switch transistor TFT-S is turned on, the light receiving element 401 may be driven in response to the power source generated by the power drive unit and provided through the power line PL. The light receiving element 401 may receive the power source and receive the conversion light EDL described with reference to FIG. 2A to generate the current, and the light emitting element 402 may be driven by the generated current. According to exemplary embodiments of the present disclosure, the power source generated by the power drive unit may be a direct current power source, and a value of the current generated by the light receiving element 401 may be determined by the direct current power source. As described above, since the light receiving element 401 is used to display the image, the pixels PX may be driven not by an alternating current power source but rather by the direct current power source. In addition, the current generated by the light receiving element 401 may be amplified by using the direct current power source. The amplification of the current generated by the light receiving element 401 will be described in detail later.

The reset transistor TFT-R may include a first electrode connected to an anode electrode of the light receiving element 401 and an anode electrode of the light emitting element 402. The reset transistor TFT-R may include a second electrode to which a common power source ELVSS is applied. The reset transistor TFT-R may be turned on in response to a reset signal RS applied thereto through a gate electrode of the reset transistor TFT-R and may perform an initialization operation to initialize a voltage of the anode electrode of the light emitting element 402.

A cathode electrode of the light emitting element 402 may be connected to the common power source ELVSS. The light emitting element 402 emits a light in response to the current from the light receiving element 401, and thus the image IM described with reference to FIG. 1 may be displayed.

As described above, the pixel PX receives the conversion light EDL through the light receiving element 401 and generates the current without receiving a data voltage from the data driver, and the light emitting element 402 displays the image IM. Accordingly, a brightness problem caused by a difference in energy density in a conventional screen that performs only an image forming function may be solved, and thus an image quality may be more evenly displayed. Further, a crosstalk phenomenon caused by a data-line signal may be solved fundamentally. In addition, the above-described driving principle of the display device may be applied to various displays, such as a super large display, a transparent display, a virtual reality (VR) display, etc.

Figure 5A:
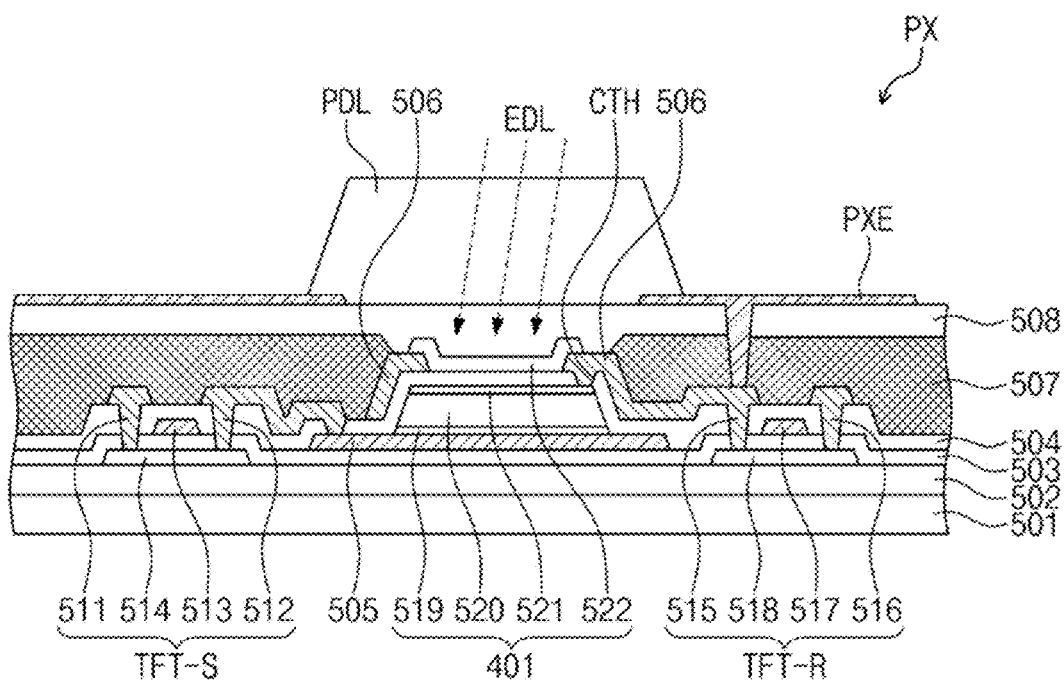
FIG. 5A is a cross-sectional view illustrating a cross-sectional structure of the pixel shown in FIG. 4 according to an exemplary embodiment of the present disclosure.

FIG. 5A is a cross-sectional view illustrating a cross-sectional structure of the pixel PX shown in FIG. 4 according to an exemplary embodiment of the present disclosure.

Referring to FIG. 5A, a base layer 501 may have a quadrangular plate shape or another shape. The base layer 501 may be formed of a plastic material having high heat resistance and durability, such as polyimide (PI), polyethylene terephthalate (PET), polyethylene naphtalate (PEN), polycarbonate (PC), polyarylate (PAR), polyetherimide (PEI), polyethersulphone (PES), Fiber Reinforced Plastics, etc.

A buffer layer 502 may be disposed on an upper surface of the base layer 501 to provide smoothness on the upper surface of the base layer 501 and prevent foreign substances from entering. The buffer layer 502 may include an inorganic material, such as silicon oxide, silicon nitride, silicon oxynitride, aluminum oxide, aluminum nitride, titanium oxide, titanium nitride, or the like, an organic material, such as polyimide, polyester, acryl, or the like, or a stacked structure of materials selected from the above-mentioned materials.

The switch transistor TFT-S and the reset transistor TFT-R may be disposed on the buffer layer 502. For example, an active layer 514 of the switch transistor TFT-S and an active layer 518 of the reset transistor TFT-R may be disposed on the buffer layer 502.

A first insulating layer 503 may be disposed on the active layer 514 of the switch transistor TFT-S and the active layer 518 of the reset transistor TFT-R. For example, the first insulating layer 503 may include an insulating material, such as silicon oxide, silicon nitride, silicon oxynitride, etc., and may be formed by various methods, e.g., a PECVD method, an APCVD method, an LPCVD method, etc.

The first insulating layer 503 may be disposed between the active layer 514 of the switch transistor TFT-S and the gate electrode 513 of the switch transistor TFT-S to serve as a gate insulating layer of the switch transistor TFT-S.

The first insulating layer 503 may be disposed between the active layer 518 of the reset transistor TFT-R and the gate electrode 517 of the reset transistor TFT-R to serve as a gate insulating layer of the reset transistor TFT-R.

The first insulating layer 503 may have a structure in which silicon oxide and silicon nitride are stacked one on another.

A lower metal layer 505 may be formed on the first insulating layer 503. The lower metal layer 505 may include a metal material. The lower metal layer 505 may block an external light traveling to the light receiving element 401.

A second insulating layer 504 may be disposed on the first insulating layer 503 and the lower metal layer 505.

The second insulating layer 504 may be disposed between the gate electrode 517 of the reset transistor TFT-R and a first electrode 515 of the reset transistor TFT-R, and the gate electrode 517 of the reset transistor TFT-R and a second electrode 516 of the reset transistor TFT-R. The second insulating layer 504 may be disposed between the gate electrode 513 of the switch transistor TFT-S and a first electrode 511 of the reset switch transistor TFT-S, and the gate electrode 511 of the switch transistor TFT-S and a second electrode 512 of the switch transistor TFT-S.

Contact holes may be formed through the first insulating layer 503 and a second insulating layer 504 to define a source area and a drain area of the active layer 514 of the switch transistor TFT-S and to define a source area and a drain area of the active layer 518 of the reset transistor TFT-R. The first electrode 511 of the switch transistor TFT-S and the second electrode 512 of the switch transistor TFT-S may be electrically connected to each other by the active layer 514 through the contact holes. According to an exemplary embodiment of the present disclosure, the first electrode 511 of the switch transistor TFT-S may be a drain electrode and the second electrode 512 of the switch transistor TFT-S may be a source electrode.

The first electrode 515 of the reset transistor TFT-R and the second electrode 516 of the reset transistor TFT-R may be electrically connected to each other by the active layer 518 through the contact holes.

The light receiving element 401 may be disposed on the lower metal layer 505.

A cover metal layer 506 may be disposed on the second insulating layer 504. The cover metal layer 506 may block the external light traveling to the light receiving element 401 as the above-mentioned lower metal layer 505.

The cover metal layer 506 may electrically connect the first electrode 515 of the reset transistor TFT-R to the anode electrode 521 of the light receiving element 401.

The second insulating layer 504 may be provided with a contact hole CTH formed therethrough to correspond to the anode electrode 521 of the light receiving element 401. A light receiving electrode 522 of the light receiving element 401 may be connected to the cover metal layer 506 through the contact hole CTH. The cover metal layer 506 may be connected to the anode electrode 521 of the light receiving element 401 as described above. In addition, the second electrode 512 of the switch transistor TFT-S may be electrically connected to the cathode electrode 519 of the light receiving element 401 through the lower metal layer 505.

Accordingly, the light receiving electrode 522 may absorb an energy from the conversion light EDL, and the absorbed energy may be transferred to the anode electrode 521 of the light receiving element 401, thereby forming an electric field. Holes and electrons are generated in an active layer 520 of the light receiving element 401 by the electric field, and a current generated by a movement of the holes and the electrons may flow to a pixel electrode PXE through the cover metal layer 506. According to an exemplary embodiment of the present disclosure, the pixel electrode XPE may be the anode electrode of the light emitting element 402 described with reference to FIG. 4.

A third insulating layer 507 may be disposed on the switch transistor TFT-S and the reset transistor TFT-R. For example, the third insulating layer 507 may be dispose d to cover an upper portion of the switch transistor TFT-S and the reset transistor TFT-R. The third insulating layer 507 may include an inorganic material. The third insulating layer 507 may protect the switch transistor TFT-S and the reset transistor TFT-R.

A fourth insulating layer 508 may be disposed on the third insulating layer 507. The fourth insulating layer 508 may cover the light receiving electrode 522 of the light receiving element 401. The fourth insulating layer 508 may include an organic material. The fourth insulating layer 508 may include a material that transmits the conversion light EDL described above with reference to FIG. 2.

A pixel definition layer PDL may be disposed on the pixel electrode PXE to cover an edge portion of the pixel electrode PXE and to expose a center portion of the pixel electrode PXE. The pixel definition layer PDL may include an organic material such as polyimide.

The pixel definition layer PDL may overlap with the light receiving element 401. For example, the pixel definition layer PDL may overlap with the light receiving element 401 in a thickness direction of the base layer 501. Accordingly, in a case that the conversion light EDL is incident to a front surface of the screen 102, the pixel definition layer PDL may transmit the conversion light EDL, and the transmitted light may be provided to the light receiving electrode 522 after passing through the fourth insulating layer 508.

Figure 5B:
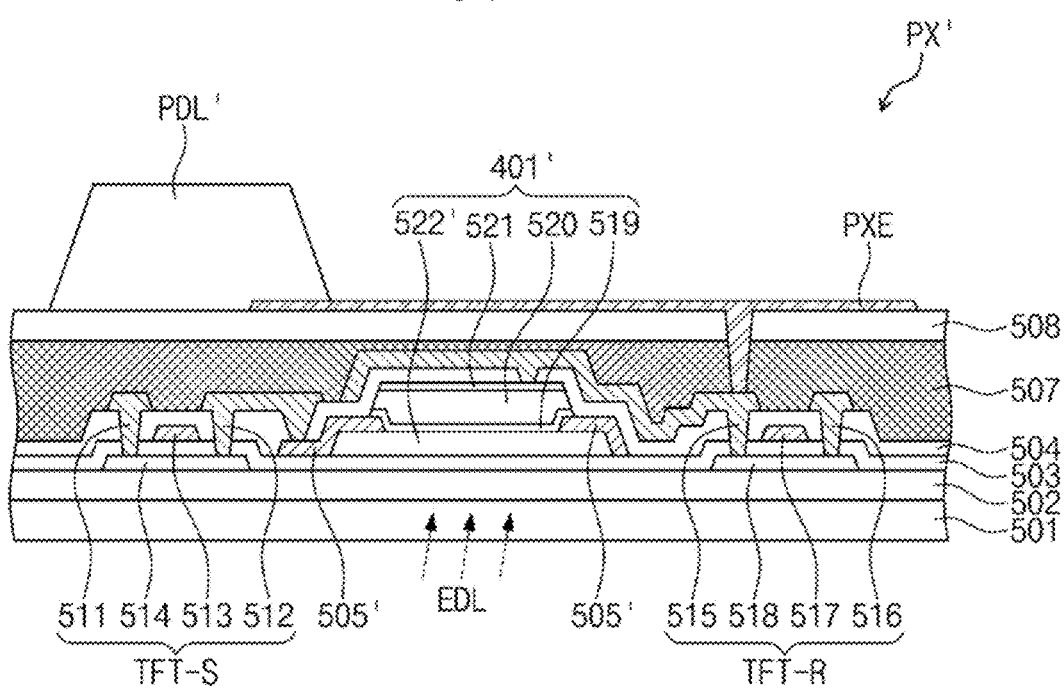
FIG. 5B is a cross-sectional view illustrating a cross-sectional structure of a pixel according to an exemplary embodiment of the present disclosure.

FIG. 5B is a cross-sectional view illustrating a cross-sectional structure of a pixel PX' according to an exemplary embodiment of the present disclosure.

According to the arrangement of FIG. 51B, the conversion light EDL is incident to a lower surface of a base layer 501.

In this case, a light receiving electrode 522' may be disposed on an upper surface of a first insulating layer 503. A lower metal layer 505' may cover an edge portion of the light receiving electrode 522'.

In addition, in the case that the conversion light EDL is incident to the lower surface of the base layer 501, a pixel definition layer PDL' might not overlap with a light receiving element 401' in a thickness direction of the base layer 501. In this case, the pixel electrode PXE may overlap with the light receiving element 401' in the thickness direction of the base layer 501.

In the pixel PX' shown in FIG. 5B, the cover metal layer 506 may be omitted, but other elements may be the same as those shown in FIG. 5A.

Figure 5C:
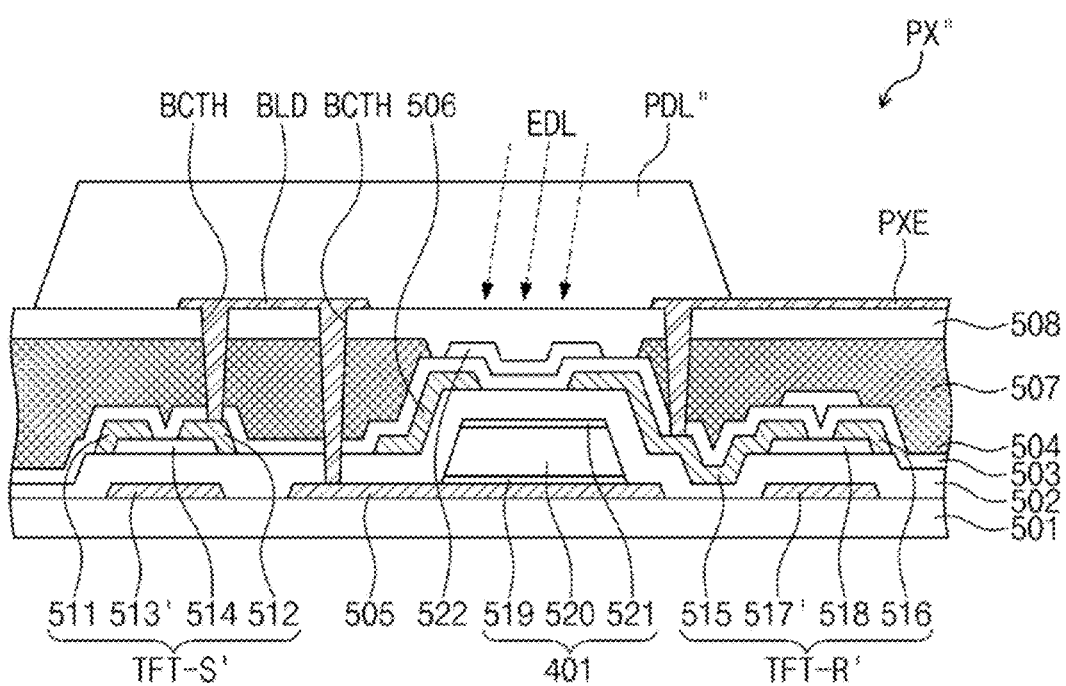
FIG. 5C is a cross-sectional view illustrating a cross-sectional structure of a pixel according to an exemplary embodiment of the present disclosure.

FIG. 5C is a cross-sectional view illustrating a cross-sectional structure of a pixel PX" according to an exemplary embodiment of the present disclosure.

FIG. 5C shows a case in which a gate electrode 513' of a switch transistor TFT-S' and a gate electrode 517' of a reset transistor TFT-R' are disposed on an upper surface of a base layer 501. For example, a first electrode 511 and a second electrode 512 of the switch transistor TFT-S' may be disposed at a position higher than the gate electrode 513' of the switch transistor TFT-S'. In this case, the pixel PX" may include a bridge BLD (hereinafter, referred to as a "metal connection layer") when compared to FIG. 5A. The metal connection layer BLD may electrically connect the lower metal layer 505 to the second electrode 512 of the switch transistor TFT-S' through a contact hole BCTH commonly formed through the third insulating layer 507 and the fourth insulating layer 508. As shown in FIG. 5C, a center portion of the metal connection layer BLD may be disposed on the fourth insulating layer 508. In this case, the pixel definition layer PDL may cover the metal connection layer BLD and overlap with the switch transistor TFT-S' and the light receiving element 401 in a thickness direction of the pixel PX". Detailed descriptions of other elements may be substantially the same as those shown in FIG. 5A.

Figure 6:
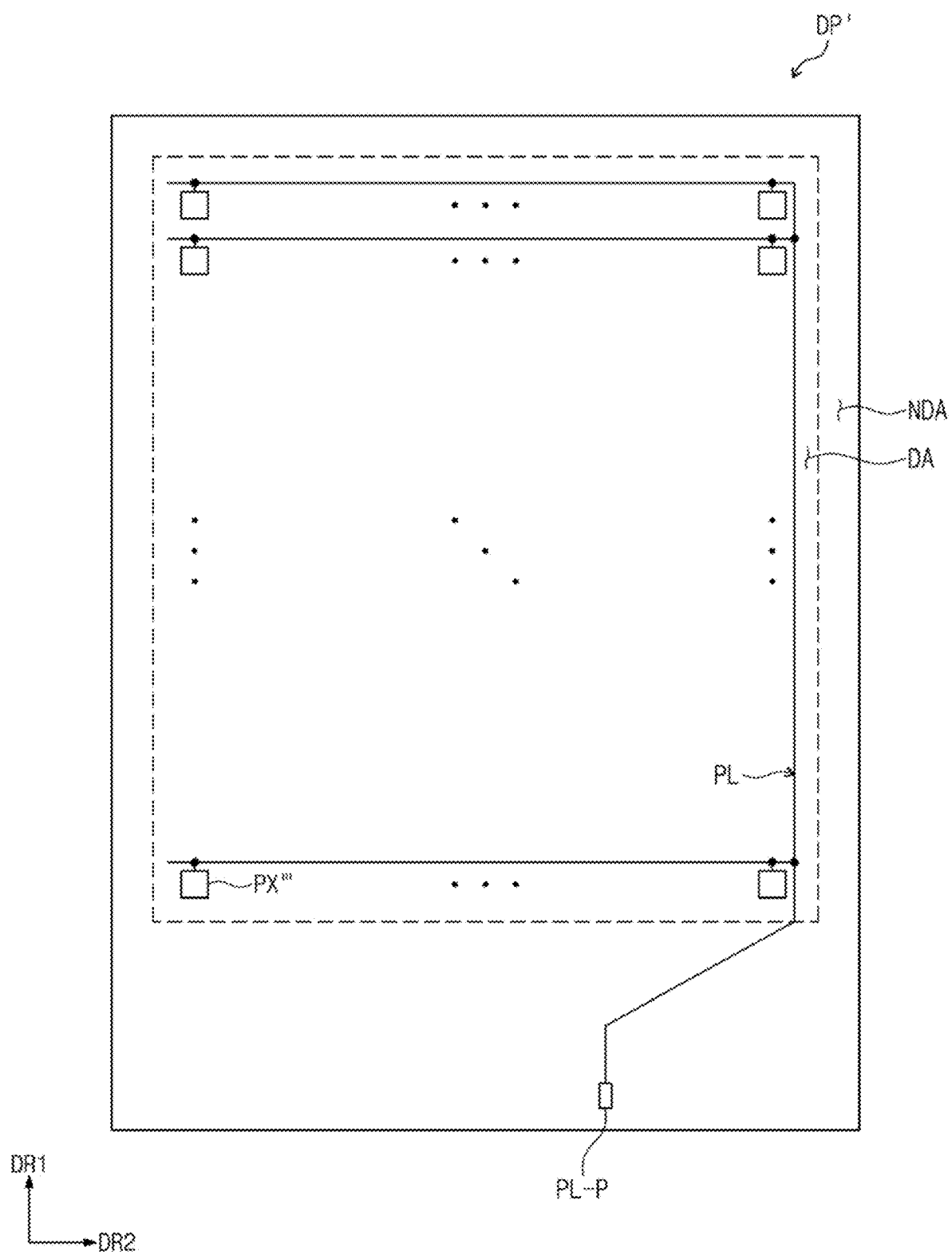
FIG. 6 is a plan view illustrating a display panel according to an exemplary embodiment of the present disclosure.
Figure 7A:
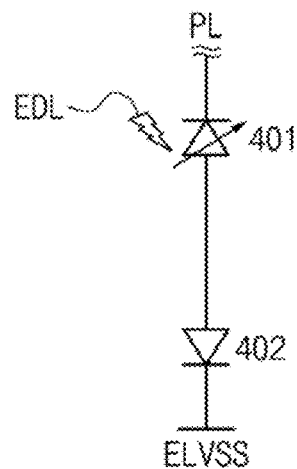
FIG. 7A is an equivalent circuit diagram illustrating a pixel shown in FIG. 6.
Figure 7B:
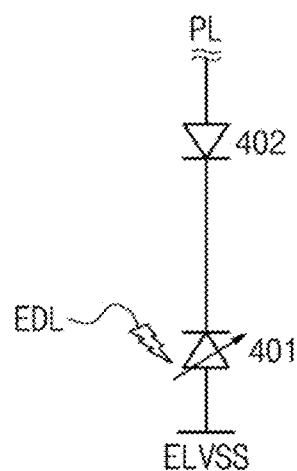
FIG. 7B is an equivalent circuit diagram illustrating a pixel according to an exemplary embodiment of the present disclosure.

FIG. 6 is a plan view illustrating a display panel DP' according to an exemplary embodiment of the present disclosure. FIG. 7A is an equivalent circuit diagram illustrating a pixel PX''' shown in FIG. 6. FIG. 7B is an equivalent circuit diagram showing a pixel according to an exemplary embodiment of the present disclosure.

The gate driving circuit DCV and the gate lines GL are omitted in the display panel DP' shown in FIG. 6 when compared to the display panel DP shown in FIG. 3.

Accordingly, the switch transistor TFT-S is omitted in the equivalent circuit diagram shown in FIG. 7A when compared to the equivalent circuit diagram shown in FIG. 4. Further, the reset transistor TFT-R shown in FIG. 4 is omitted in FIG. 7A. Detailed descriptions of other elements may be substantially the same as those described with reference to FIGS. 3 and 4.

As described above, since the gate driving circuit DCV and the gate lines GL are omitted and a driving timing of the pixels PX is controlled by only the conversion light EDL described above, a bezel portion of the display panel DP' may be reduced, and the display device may be slimmed.

According to the configuration of FIG. 7B, the light emitting element 402 may be connected to the power line PL, and the light receiving element 401 may be connected to the common power source ELVSS. The driving method of the pixel shown in FIG. 7B may be substantially the same as the driving method of the pixel PX" shown in FIG. 7A.

FIGS. 8A to 8D are circuit diagrams illustrating pixel circuits to amplify a current flowing through the light receiving element 401.

Figure 8A:
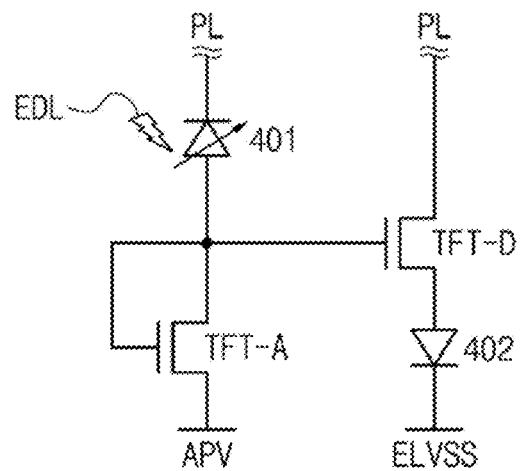
FIGS. 8A to 8D are circuit diagrams illustrating pixel circuits configured to amplify a current flowing through a light receiving element according to an exemplary embodiment of the present disclosure.

The pixel circuit shown in FIG. 8A may further include an amplifying transistor TFT-A and a driving transistor TFT-D when compared to the circuit diagram shown in FIG. 7A.

The amplifying transistor TFT-A may include a first electrode connected to an amplifying power source APV and a second electrode connected to the anode electrode of the light receiving element 401 and a gate electrode of the driving transistor TFT-D. In addition, the amplifying transistor TFT-A may include a gate electrode connected to the gate electrode of the driving transistor TFT-D and the anode electrode of the light receiving element 401. The driving transistor TFT-D may include a first electrode connected to the power line PL and a second electrode connected to the anode electrode of the light emitting element 402. According to an exemplary embodiment of the present disclosure, the first electrode of the amplifying transistor TFT-A may be a drain electrode, and the second electrode of the amplifying transistor TFT-A may be a source electrode. According to an exemplary embodiment of the present disclosure, the first electrode of the driving transistor TFT-D may be a drain electrode, and the second electrode of the driving transistor TFT-D may be a source electrode.

Accordingly, a current provided from the amplifying transistor TFT-A and a current provided from the light receiving element 401 may be applied to the gate electrode of the driving transistor TFT-D. As a result, an amount of the current flowing to the light emitting element 402 through the driving transistor TFT-D may be controlled in accordance with a charge amount applied to the gate electrode of the driving transistor TFT-D. For example, the current flowing through the light emitting element 402 may be more amplified than the current flowing through the pixel circuit shown in FIG. 7A.

Figure 8B:
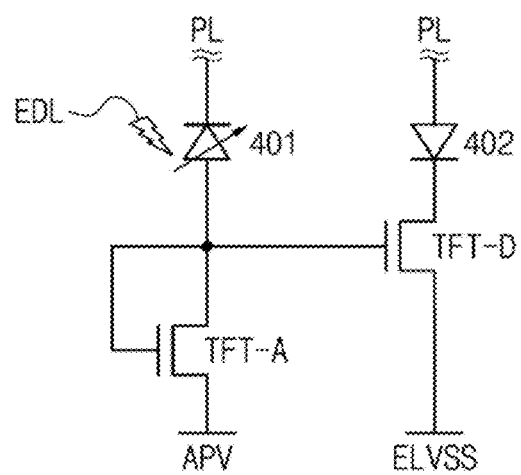

In FIG. 8B, a position of the light emitting element 402 is changed to be different from that of the light emitting element 402 in FIG. 8A. Referring to FIG. 8B, the anode electrode of the light emitting element 402 may be connected to the power line PL, and the cathode electrode of the light emitting element 402 may be connected to the first electrode of the driving transistor TFT-D. Other elements shown in FIG. 8B may have substantially the same structure and function as those described in FIG. 8A.

Figure 8C:
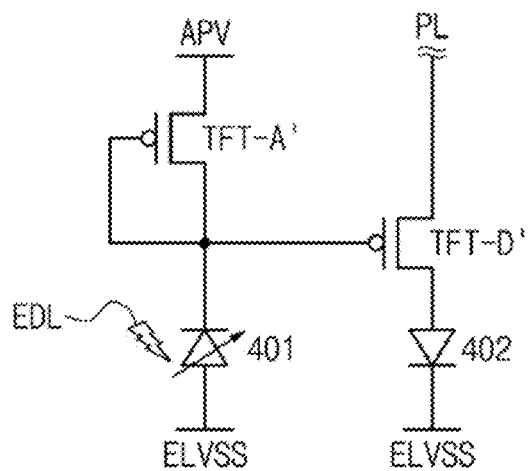
Figure 8D:
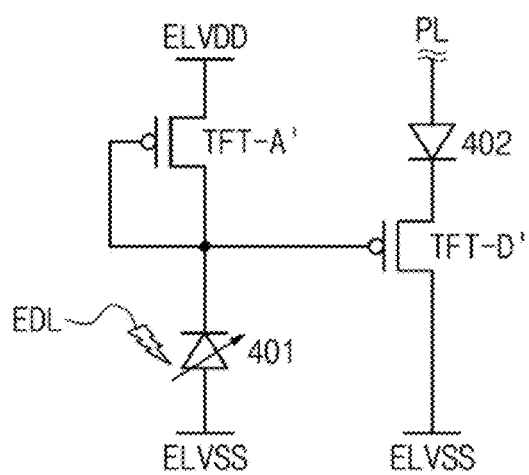

FIGS. 8A and 8B show an NMOS transistor used as the amplifying transistor TFT-A and the driving transistor TFT-D, but a PMOS transistor may be used as the amplifying transistor TFT-A and the driving transistor TFT-D as shown in FIGS. 8C and 8D.

Referring to FIG. 8C, the cathode electrode of the light receiving element 401 may be connected to a gate electrode of a driving transistor TFT-D' and a second electrode of an amplifying transistor TFT-A'. A first electrode of the driving transistor TFT-D' may be connected to the amplifying power source APV. In FIG. 8D, a position of the light emitting element 402 shown in FIG. 8C is changed. Referring to FIG. 8D, the anode electrode of the light emitting element 402 may be connected to a power line PL, and the cathode electrode of the light emitting element 402 may be connected to the first electrode of the driving transistor TFT-D'. Other elements shown in FIG. 8D may have substantially the same structure and function as those described in FIG. 8C.

Figure 9A:
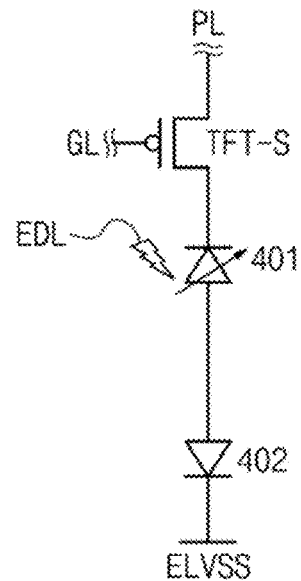
FIG. 9A is a circuit diagram illustrating showing a pixel circuit obtained by adding a switch transistor to the pixel circuit shown in FIG. 7A according to an exemplary embodiment of the present disclosure.

FIG. 9A is a circuit diagram illustrating a pixel circuit obtained by adding the switch transistor TFT-S to the pixel circuit shown in FIG. 7A.

Referring to FIG. 9A, the first electrode of the switch transistor TFT-S may be connected to the power line PL, and the second electrode of the switch transistor TFT-S may be connected to the cathode electrode of the light receiving element 401. The gate electrode of the switch transistor TFT-S may be connected to the gate line. Other elements shown in FIG. 9A may have substantially the same structure and function as those described in FIG. 7A. For example, the reset transistor TFT-R shown in FIG. 4 may be omitted.

Figure 9B:
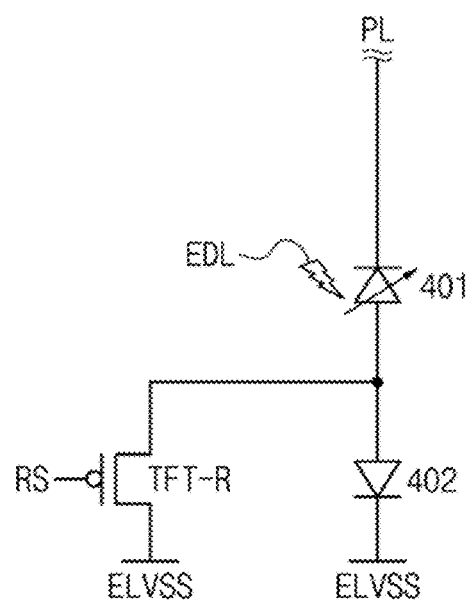
FIG. 9B is a circuit diagram illustrating a pixel circuit obtained by adding a reset transistor to the pixel circuit shown in FIG. 7A according to an exemplary embodiment of the present disclosure.

FIG. 9B is a circuit diagram illustrating a pixel circuit obtained by adding the reset transistor TFT-R to the pixel circuit shown in FIG. 7A.

Referring to FIG. 9B, the first electrode of the reset transistor TFT-R may be connected to the common power source ELVSS, and the second electrode of the reset transistor TFT-R may be connected to the anode electrode of the light receiving element 401 and the anode electrode of the light emitting element 402. The reset signal RS may be applied to the gate electrode of the reset transistor TFT-R. Other elements shown in FIG. 9B may have substantially the same structure and function as those described in FIG. 7A. For example, the switch transistor TFT-S shown in FIG. 4 may be omitted.

Figure 10:
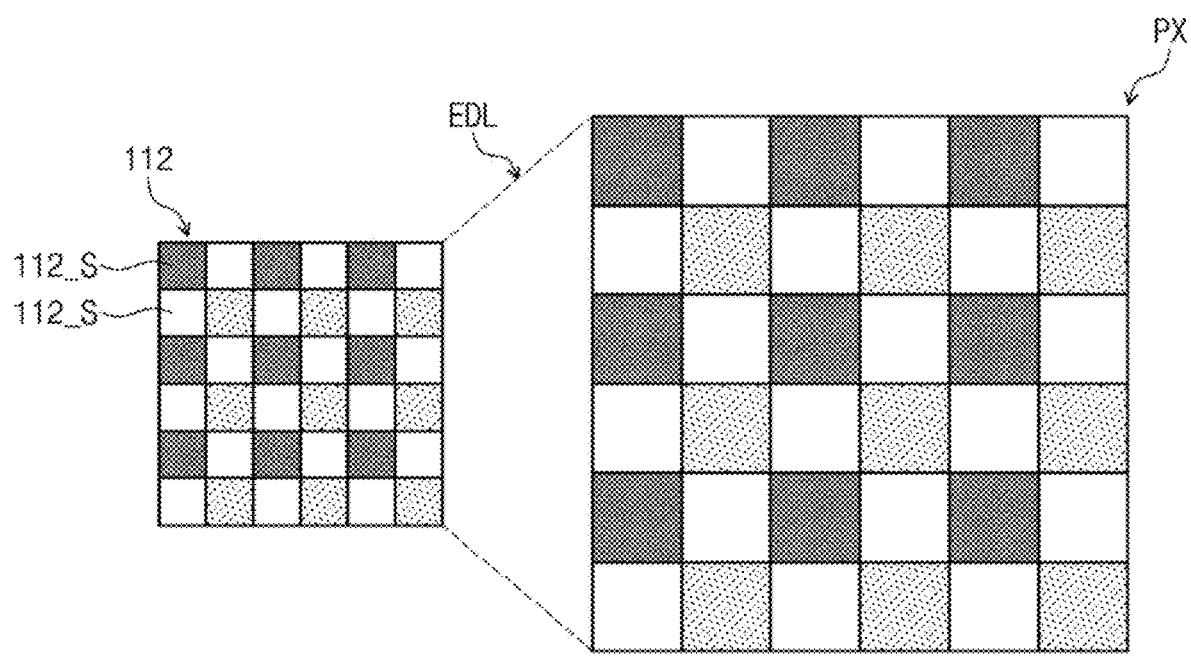
FIG. 10 is a diagram illustrating a method of driving a display device according to an exemplary embodiment of the present disclosure.

FIG. 10 is a diagram illustrating a method of driving a display device according to an exemplary embodiment of the present disclosure.

Referring to FIGS. 2A and 10, the light converter 112 may include a plurality of optical pixels 112_S. According to an exemplary embodiment of the present disclosure, the optical pixels 112_S may include the liquid crystal layer described above and may change the intensity of the received light ECL through the liquid crystal layer to generate the conversion light EDL.

The optical pixels 112_S may emit the conversion light EDL to the pixels PX, respectively. In FIG. 10, the pixels PX may include a plurality of first pixels PX, a plurality of second pixels PX, and a plurality of third pixels PX.

The number of the optical pixels 112_S may be equal to the number of the pixels PX. For example, one of the optical pixels 112_S may emit the conversion light EDL to correspond to one of the pixels PX. For example, each of the optical pixels 112_S may emit the conversion light EDL to one pixel PX among the pixels PX, and each of the pixels PX may be driven by the method described with reference to FIG. 4. In addition, the conversion light EDL may be, but is not necessarily limited to, a laser beam. According to an exemplary embodiment of the present disclosure, the conversion light EDL may be an infrared laser beam. In this case, the laser beam EDL emitted from each of the optical pixels 112_S may accurately reach the one of the pixels PX. Accordingly, in the case that the conversion light EDL is the laser beam, a phenomenon in which the driving of each pixel is interfered by the diffusion of the light (i.e., a phenomenon in which the pixel receives the conversion light EDL from non-corresponding optical pixel) may be lessened. Consequently, a quality of the image may be increased.

Figure 11A:
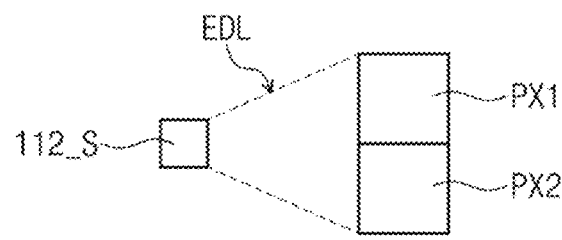
FIGS. 11A and 11B are diagrams illustrating a method of driving a display device according to an exemplary embodiment of the present disclosure.
Figure 11B:
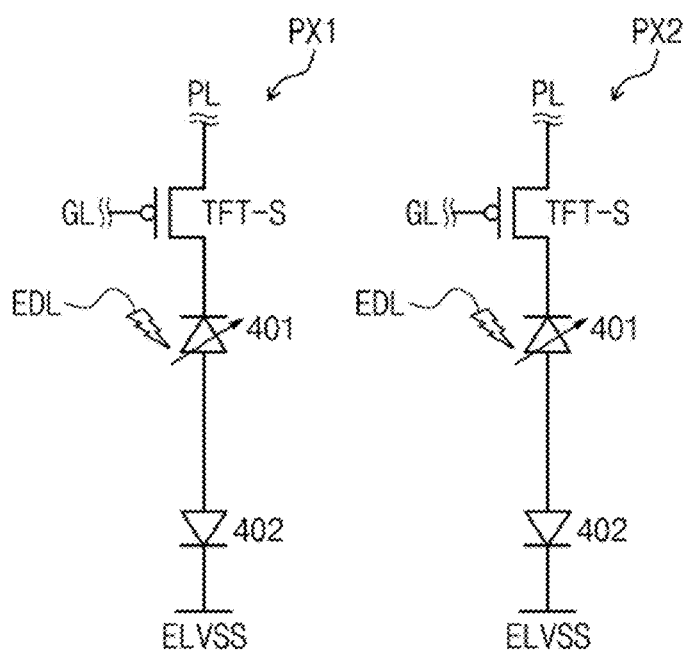
Figure 11B:
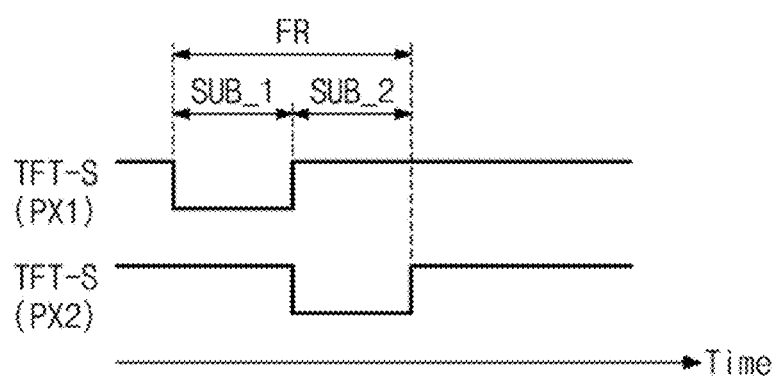

FIGS. 11A and 11B are diagrams illustrating a method of driving a display device according to an exemplary embodiment of the present disclosure.

Referring to FIGS. 11A and 11B, a switch transistor TFT-S of a first pixel PX1 among pixels PX may be turned on during a first sub-frame SUB_1 within one frame FR. In this case, the first pixel PX1 may receive the conversion light EDL emitted from one optical pixel 112_S among optical pixels 112_S. During a second sub-frame SUB_2 after the first sub-frame SUB_1 within the one frame, a switch transistor TFT-S of a second pixel PX2 different from the first pixel PX1 among the pixels PX may be turned on. In this case, the second pixel PX2 may receive the conversion light EDL emitted from the same optical pixel 112_S as the optical pixel 112_S that emits the conversion light EDL to the first pixel PX1. In the above descriptions, the first sub-frame SUB_1 does not overlap with the second sub-frame SUB_2, but other approaches may be used. For example, the first sub-frame SUB_1 and the second sub-frame SUB_2 may overlap with each other.

As described above, one optical pixel 112_S may drive plural pixels PX (e.g., first and second pixels PX1 and PX2), respectively, during plural sub-frames SUB1 and SUB2 obtained by dividing one frame. In this way, more pixels PX than the number of optical pixels 112_S may be driven using the optical pixels 112_S, and thus the image having a high resolution may be implemented without the need for one-to-one correspondence between the number of pixels PX and optical pixels 112_S.

Figure 12A:
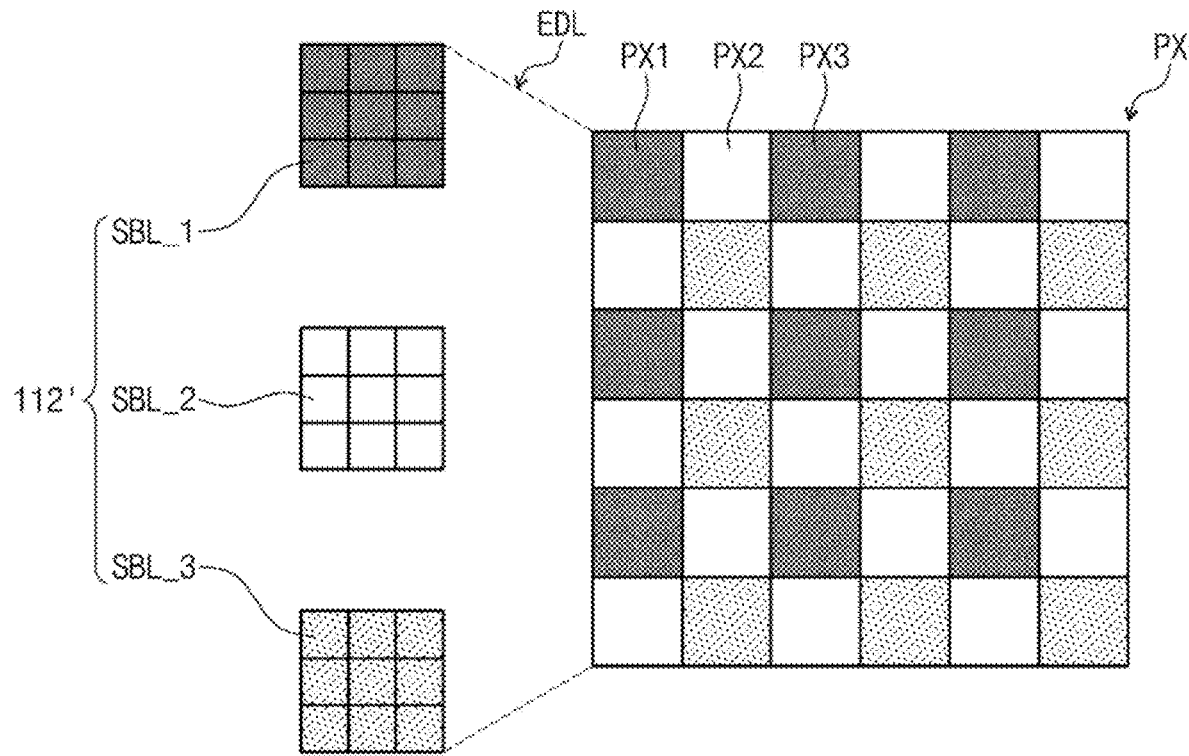
FIGS. 12A and 12B are diagrams illustrating a method of driving a display device according to an exemplary embodiment of the present disclosure.
Figure 12B:
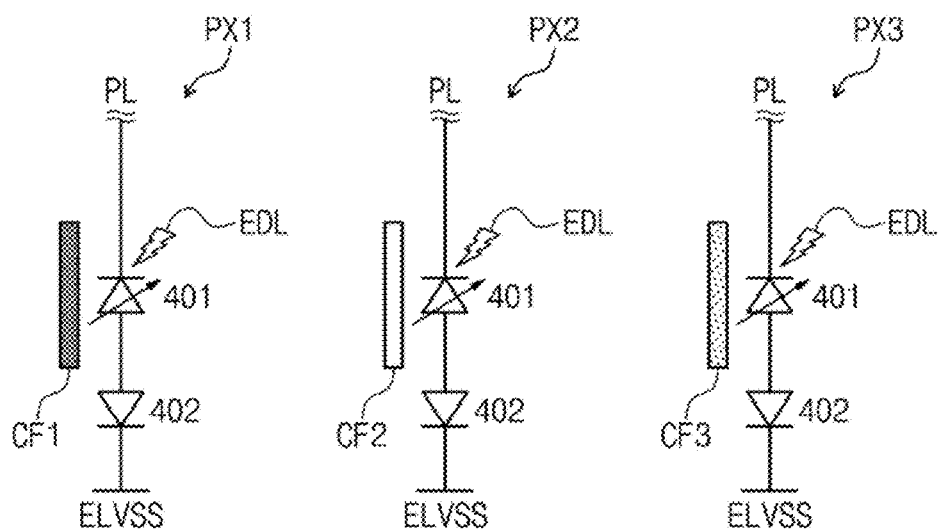

FIGS. 12A and 12B are diagrams illustrating a method of driving a display device according to an exemplary embodiment of the present disclosure.

Referring to FIGS. 12A and 12B, a light converter 112' may include a plurality of optical pixels emitting conversion lights EDL having different wavelengths from each other. For example, the light converter 112' may include a first optical pixel SBL_1 emitting the conversion light EDL having a first wavelength, a second optical pixel SBL_2 emitting the conversion light EDL having a second wavelength different from the first wavelength, and a third optical pixel SBL_3 emitting the conversion light EDL having a third wavelength different from the first and second wavelengths.

Color filters CF1, CF2, and CF3 may be respectively disposed above light receiving elements 401 of the pixels. Accordingly, each of the pixels PX may selectively receive one of the conversion lights EDL having different wavelengths from each other. Therefore, the first pixel PX1 may selectively receive the conversion light EDL having the first wavelength, the second pixel PX2 may selectively receive the conversion light EDL having the second wavelength, and the third pixel PX3 may selectively receive the conversion light EDL having the third wavelength. For example, a first color filter CF1 is disposed above the light receiving element 401 of the first pixel PX1, and thus the first pixel PX1 may selectively receive the conversion light EDL having the first wavelength. A second color filter CF2 is disposed above the light receiving element 401 of the second pixel PX2, and thus the second pixel PX2 may selectively receive the conversion light EDL having the second wavelength. A third color filter CF3 is disposed above the light receiving element 401 of the third pixel PX3, and thus the third pixel PX3 may selectively receive the conversion light EDL having the third wavelength.

As described above, since each of the pixels PX selectively receives one of the conversion lights EDL having different wavelengths from each other, a color mixture phenomenon may be prevented from occurring when the image is displayed.

Figure 13A:
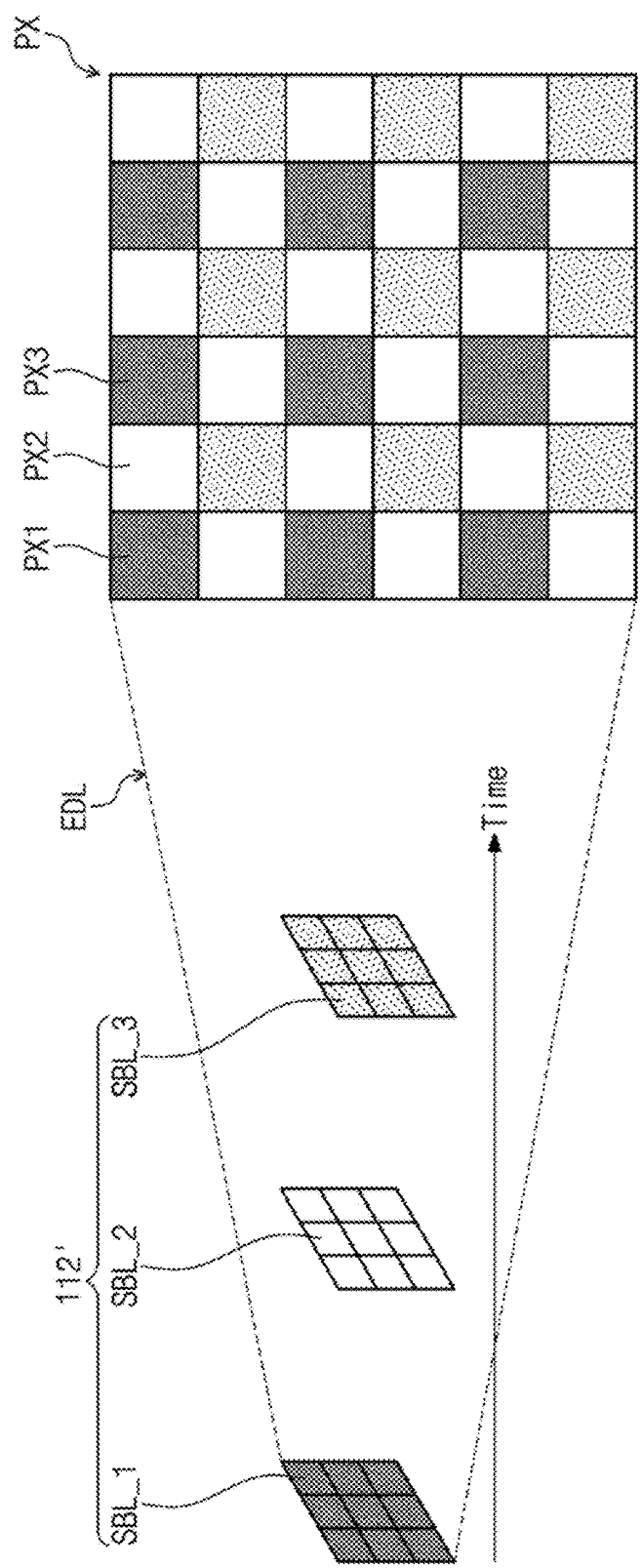
FIGS. 13A and 13B are diagrams illustrating a method of driving a display device according to an exemplary embodiment of the present disclosure.
Figure 13B:
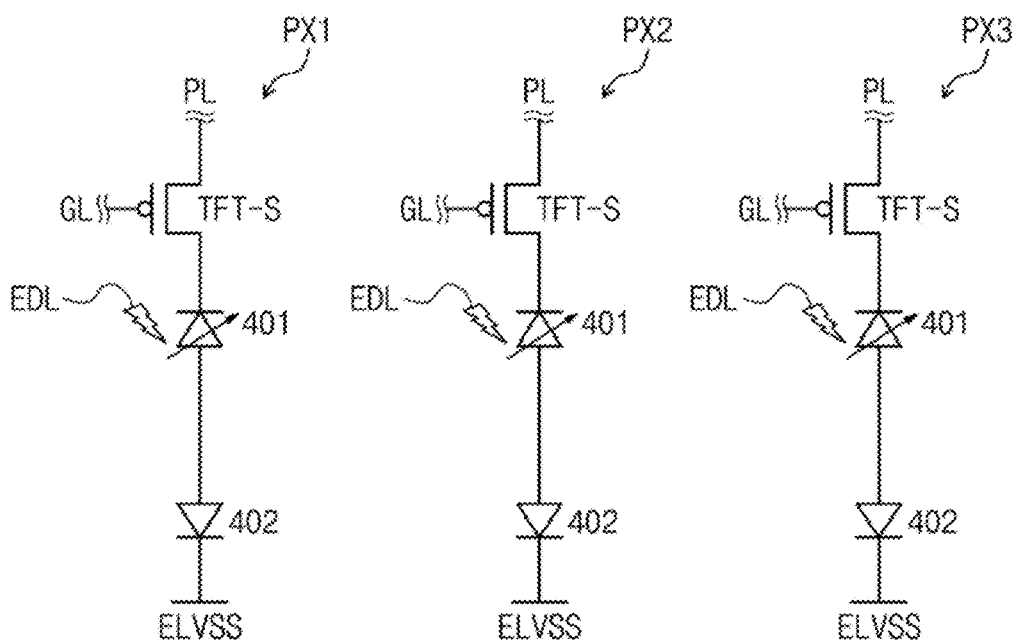
Figure 13B:
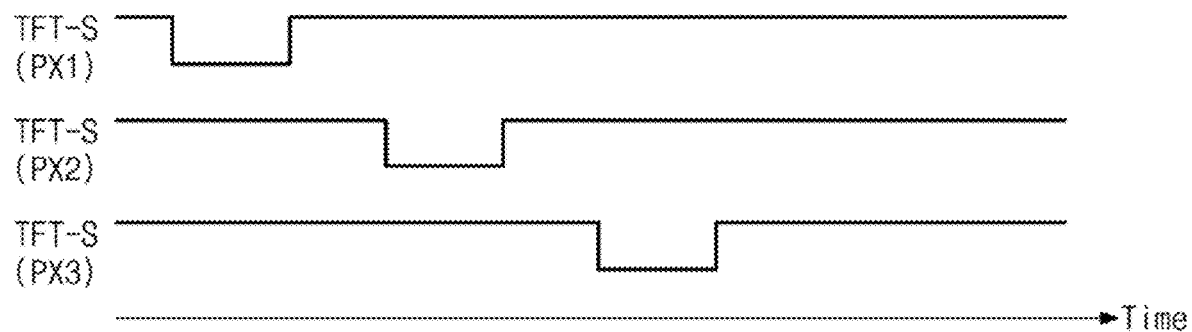

FIGS. 13A and 13B are diagrams illustrating a method of driving a display device according to an exemplary embodiment of the present disclosure.

Referring to FIGS. 13A and 13B, a light converter 112' may include a plurality of optical pixels emitting conversion lights EDL having different wavelengths from each other. For example, the light converter 112' may include a first optical pixel SBL_1 emitting the conversion light EDL having a first wavelength, a second optical pixel SBL_2 emitting the conversion light EDL having a second wavelength different from the first wavelength, and a third optical pixel SBL_3 emitting the conversion light EDL having a third wavelength different from the first and second wavelengths.

The optical pixels SBL_1, SBL_2, and SBL_3 may sequentially emit the conversion light EDL. For example, the second optical pixel SBL_2 may emit the conversion light EDL having the second wavelength after the first optical pixel SBL_1 emits the conversion light EDL having the first wavelength. Then, the third optical pixel SBL_3 may emit the conversion light EDL having the third wavelength after the second optical pixel SBL_2 emits the conversion light EDL having the second wavelength.

In this case, each of the pixels PX may selectively receive one of the conversion lights EDL having different wavelengths from each other. Accordingly, in the case that the conversion light EDL having the first wavelength is emitted, the first pixel PX1 is driven by the switch transistor TFT-S of the first pixel PX1 to receive the conversion light EDL having the first wavelength, and the second pixel PX2 and the third pixel PX3 are not driven. In the case that the conversion light EDL having the second wavelength is emitted, the second pixel PX2 is driven by the switch transistor TFT-S of the second pixel PX2 to receive the conversion light EDL having the second wavelength, and the first pixel PX1 and the third pixel PX3 are not driven. In the case that the conversion light EDL having the third wavelength is emitted, the third pixel PX3 is driven by the switch transistor TFT-S of the third pixel PX3 to receive the conversion light EDL having the third wavelength, and the first pixel PX1 and the second pixel PX2 are not driven.

As described above, since the pixels PX are sequentially driven in response to the conversion lights EDL that are sequentially emitted, the color mixture phenomenon may be prevented from occurring when the image is displayed.

FIGS. 14A to 14C are views explaining a method in which a user USER views an image displayed through a display device according to an exemplary embodiment of the present disclosure.

A way that the user USER views the image may be distinguished depending on a position of the projector 101 or backlight unit.

The above descriptions are described on the assumption that the projector 101 or backlight unit emits the conversion light EDL to a front surface of the base layer 501 and the pixels PX are arranged on the front surface of the base layer 501, but herein after different examples will be described.

Referring to FIG. 14A, the pixels PX may be arranged on a rear surface of the base layer 501. The projector 101 may emit the conversion light EDL to the front surf ace of the base layer 501, and the user USER may view an image IM' in a direction to which the user USER sees the front surface of the base layer 501.

Referring to FIG. 14B, the pixels PX may be arranged on the front surface of the base layer 501. The projector 101 or backlight unit may emit the conversion light EDL to the rear surface of the base layer 501, and the user USER may view the image IM" in the direction to which the user USER sees the front surface of the base layer 501.

Referring to FIG. 14C, the pixels PX may be arranged on the rear surface of the base layer 501. The projector 101 or backlight unit may emit the conversion light EDL to the rear surface of the base layer 501, and the user USER may view the image IM'" in the direction to which the user USER sees the front surface of the base layer 501.

As described above, the way that the user USER views the image may be changed depending on location and purpose.

FIGS. 15A to 15C are diagrams illustrating a display device according to an exemplary embodiment of the present disclosure.

Referring to FIG. 15A, a first surface F1 through which an image is displayed and a second surface F2 opposite to the first surface F1 may be defined in a screen 102. As an example of the present disclosure, the first surface F1 may be a front surface of the screen 102 that is viewed by a user USER, and the second surface F2 may be a rear surface of the screen 102 that is not seen by the user USER.

The projector 101 or backlight unit may emit a conversion light EDL to the second surface F2.

A first optical sheet RST1 may be disposed on the second surface F2. Accordingly, the projector 101 or backlight unit may emit the conversion light EDL to the first optical sheet RST1.

The first optical sheet RST1 may transmit the conversion light EDL and absorb other lights having wavelengths different from that of the conversion light EDL. For example, the first optical sheet RST1 may transmit the light having a first wavelength band in which the wavelength of the conversion light EDL is included and absorb the lights having a second wavelength band different from the first wavelength band. For example, the conversion light EDL may be an infrared light, and the first optical sheet RST1 may transmit the infrared light having the first wavelength band and absorb the light having the second wavelength band except for the wavelength band of the infrared light. The first optical sheet RST1 may include an organic material. For example, the first optical sheet RST1 may include a black-based material.

As described above, since the first optical sheet RST1 transmits the conversion light EDL emitted from the projector 101 or backlight unit and absorbs the light having other wavelengths, the first optical sheet RST1 might not interfere the transmission of signals to the screen 102. In addition, since the first optical sheet RST1 absorbs the lights having other wavelengths except for the wavelength of the conversion light EDL, the first optical sheet RST1 may perform various functions.

Referring to FIG. 15B, a projector 101 or backlight unit may emit a conversion light EDL to a second surface F2.

A second optical sheet RST2 may be disposed on a first surface F1. The project or 101 or backlight unit may emit the conversion light EDL to the second optical sheet RST2. The projector 101 or backlight unit may emit the conversion light EDL to the second surface F2.

The second optical sheet RST2 may absorb a portion of the conversion light EDL. For example, the second optical sheet RST2 may include a material that may absorb more than about 50% of the conversion light EDL. Accordingly, the second optical sheet RST2 may absorb a remaining conversion light EDL except for the conversion light EDL used to display the image.

As described above, since the second optical sheet RST2 absorbs the remaining conversion light EDL after the conversion light EDL emitted from the projector 101 or backlight unit transfers signals to the screen 102, the conversion light EDL may be prevented from being transferred to the user USER. Accordingly, the visibility of the image may be increased for the user.

The display device shown in FIG. 15C has the same structure as that of FIG. 15B except that a projector 101 or backlight unit emits a conversion light EDL to a first surface F1.

For example, the second optical sheet RST2 may absorb a portion of the conversion light EDL emitted from the projector 101 or backlight unit, and the screen 102 may display the image using the other portion of the conversion light EDL that is not absorbed by the second optical sheet RST2.

As described above, since the second optical sheet RST2 absorbs the portion of the conversion light EDL before the conversion light EDL emitted from the projector 101 or backlight unit reaches the screen 102, the conversion light EDL may be prevented from being reflected by the first surface F1 and transferred to the user USER. Accordingly, a visibility of the image may be increased for the user.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A display device comprising:
   a screen comprising a plurality of pixels displaying an image; and
   a projector comprising a light source emitting a first light and a light converter configured to change an intensity of the first light so that the projector emits a conversion light including information of the image displayed by each of the plurality of pixels,
   wherein each of the plurality of pixels of the screen comprises:
   a light receiving element configured to receive the conversion light from the projector and to generate a current proportional to an intensity of the conversion light within the light receiving element of the screen; and
   a light emitting element configured to display the image on the screen based on the generated current,
   wherein the light receiving element is electrically connected to the light emitting element and the current generated by the light receiving element is transmitted to the light emitting element by this electrical connection, and
   wherein each of the plurality of pixels does not receive data voltages corresponding to the information of the image.

2. The display device of claim 1, wherein the light converter comprises a plurality of optical pixels, wherein each of the plurality of optical pixels is configured to receive the first light and emit the conversion light according to brightness information of the image.

3. The display device of claim 1, further comprising an optical sheet, wherein the screen comprises a first surface configured to display the image and a second surface, opposite to the first surface, wherein the projector is configured to emit the conversion light to the second surface, and the optical sheet is disposed on the second surface.

4. The display device of claim 3, wherein the optical sheet is configured to transmit light having a first wavelength band in which a wavelength of the conversion light is included and is configured to absorb light having a second wavelength band in which the wavelength of the conversion light is not included.

5. The display device of claim 4, wherein the conversion light is an infrared light having the first wavelength band.

6. The display device of claim 1, further comprising an optical sheet, wherein the screen comprises a first surface configured to display the image and a second surface opposite to the first surface, the projector is configured to emit the conversion light to the first surface, and the optical sheet is disposed on the first surface and is configured to absorb a portion of the conversion light traveling to the first surface.

7. The display device of claim 1, further comprising an optical sheet, wherein the screen comprises a first surface configured to display the image and a second surface opposite to the first surface, the projector is configured to emit the conversion light to the second surface, and the optical sheet is disposed on the first surface and is configured to absorb a portion of the conversion light that is transmitted through the screen.

8. The display device of claim 1, wherein the light converter comprises a plurality of optical pixels, wherein each of the plurality of optical pixels is configured to receive the first light and emit the conversion light, and each of the plurality of optical pixels respectively emits a portion of the conversion light to the pixels.

9. The display device of claim 8, wherein a number of the optical pixels is equal to a number of the pixels.

10. The display device of claim 1, wherein the light source comprises a plurality of optical pixels, each of which is configured to emit a portion of the conversion light having different wavelengths from each other, and each of the pixels is configured to selectively receive one of the portions of the conversion light having different wavelengths from each other.

11. The display device of claim 1, wherein the light source comprises a plurality of optical pixels, each of which is configured to sequentially emit a portion of the conversion light having different wavelengths from each other, and the pixels are configured to be sequentially driven in accordance with a sequence of the portions of the conversion light.

12. The display device of claim 11, wherein the plurality of optical pixels comprises a first optical pixel configured to emit the conversion light having a first wavelength, a second optical pixel configured to emit the conversion light having a second wavelength, and a third optical pixel configured to emit the conversion light having a third wavelength, wherein the plurality of pixels comprise a first pixel, a second pixel, and a third pixel, wherein the first pixel is driven by a switch transistor of the first pixel to emit the conversion light having the first wavelength when the first optical pixel emits the conversion light having the first wavelength, wherein the second pixel is driven by a switch transistor of the second pixel to emit the conversion light having the second wavelength when the second optical pixel emits the conversion light having the second wavelength, and wherein the third pixel is driven by a switch transistor of the third pixel to emit the conversion light having the third wavelength when the third optical pixel emits the conversion light having the third wavelength.

13. The display device of claim 1, further comprising a pixel definition layer disposed between the light emitting element of each of the plurality of pixels, wherein the screen comprises a first surface and a second surface, wherein the image is displayed through the first surface, wherein the projector emits the conversion light to the first surface, and wherein the pixel definition layer overlaps the light receiving element.

14. The display device of claim 1, further comprising a pixel definition layer disposed between the light emitting element of each of the plurality of pixels, wherein each of the plurality of pixels further comprises a switch transistor configured to selectively drive the light emitting element, wherein the screen comprises a first surface and a second surface, wherein the image is displayed through the first surface, wherein the projector is configured to emit the conversion light to the second surface, and wherein the pixel definition layer overlaps with the switch transistor.

15. The display device of claim 1, further comprising a pixel definition layer, wherein each of the plurality of pixels further comprises a switch transistor configured to selectively drive the light emitting element, wherein the screen comprises a first surface and a second surface, wherein the image is displayed through the first surface, wherein the projector is configured to emit the conversion light to the first surface, a source electrode or a drain electrode of the switch transistor is electrically connected to the light receiving element through a bridge, and wherein the pixel definition layer overlaps with the light receiving element and the switch transistor.

16. The display device of claim 1, wherein the light source comprises a plurality of optical pixels, a first pixel of the plurality of pixels is driven in a first sub-frame of one frame and receives the conversion light emitted from one optical pixel of the plurality of optical pixels, and a second pixel of the plurality of pixels is driven in a second sub-frame, occurring after the first sub-frame, of the one frame, and is configured to receive the conversion light emitted from the one optical pixel of the plurality of optical pixels.

17. The display device of claim 1, wherein each of the plurality of pixels further comprises an amplifying transistor configured to connect the light receiving element to an amplification power source and to amplify the current generated by the light receiving element.

18. The display device of claim 1, further comprising a power drive unit that provides a direct current power source to each of the plurality of pixels, wherein a value of the current generated by the light receiving element of each of the plurality of pixels is determined by the direct current power source.

19. The display device of claim 1, wherein each of the plurality of pixels further comprises a switch transistor configured to selectively drive the light emitting element.

20. The display device of claim 1, wherein the light source comprises a plurality of optical pixels, wherein the conversion light is a laser beam, and the laser beam emitted from each of the plurality of optical pixels reaches one pixel of the plurality of pixels.

21. A display device comprising:
a plurality of pixels displaying an image,
wherein each of the plurality of pixels comprises:
a light receiving element configured to receive an external light and to generate a current proportional to an intensity of the external light; and
a light emitting element, electrically connected to the light receiving element, configured to display the image based on the generated current that is transmitted along the electrical connection,
wherein the external light includes gray scale information and brightness information of the image, and
wherein each of the plurality of pixels does not receive data voltages corresponding to the gray scale information and the brightness information of the image.

22. A method of driving a display device, comprising:
emitting a first light;
changing an intensity of the first light with respect to each of a plurality of optical pixels of the projector, to emit a conversion light comprising gray scale information and brightness information of an image from the projector;

emitting the conversion light to each of a plurality of pixels of a screen, the plurality of pixels of the screen corresponding to the plurality of optical pixels of the projector;

receiving the conversion light from the projector by a light receiving element of the screen to generate a current proportional to the intensity of the conversion light within the light receiving element of the screen; and displaying the image based on the generated current on the screen by a light emitting element of the screen, wherein the light receiving element is electrically connected to the light emitting element and the current generated by the light receiving element is transmitted to the light emitting element by this electrical connection, and wherein each of the plurality of pixels of the screen does not receive data voltages corresponding to the gray scale information and brightness information of the image.

* * * * *